United States Patent
Wu et al.

(10) Patent No.: US 10,983,690 B2
(45) Date of Patent: Apr. 20, 2021

(54) METHODS AND DEVICES FOR PRECLUDING TOUCH INITIATED CONTROL OPERATIONS DURING THREE-DIMENSIONAL MOTION

(71) Applicant: Motorola Mobility LLC, Chicago, IL (US)

(72) Inventors: Yi Wu, Chicago, IL (US); Zhengping Ji, Hinsdale, IL (US); Rachid Alameh, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 22 days.

(21) Appl. No.: 16/373,532

(22) Filed: Apr. 2, 2019

(65) Prior Publication Data
US 2020/0319789 A1    Oct. 8, 2020

(51) Int. Cl.
*G06F 3/041*    (2006.01)
*G06F 3/0488*    (2013.01)

(52) U.S. Cl.
CPC ........ *G06F 3/04883* (2013.01); *G06F 3/0412* (2013.01); *G06F 2203/04101* (2013.01)

(58) Field of Classification Search
CPC .............. G06F 3/04883; G06F 3/0412; G06F 2203/04101; G06F 3/0488; G06F 1/1694
See application file for complete search history.

(56) References Cited

U.S. PATENT DOCUMENTS

| | | | | |
|---|---|---|---|---|
| 7,231,231 B2* | 6/2007 | Kokko | ........... | G06F 3/0488 345/104 |
| 8,717,199 B2* | 5/2014 | Filson | ........... | G06F 3/0219 341/20 |
| 9,401,984 B1* | 7/2016 | Alameh | ........... | G06F 1/1643 |
| 9,471,109 B1* | 10/2016 | Chng | ........... | G06F 1/1677 |
| 9,507,439 B2* | 11/2016 | Yoon | ........... | G06F 3/0346 |
| 9,733,739 B1* | 8/2017 | Yates | ........... | G06F 3/0412 |
| 9,892,412 B2* | 2/2018 | Doris-Down | ........... | G06F 21/00 |
| 10,203,774 B1* | 2/2019 | Su | ........... | G06F 3/0354 |

(Continued)

OTHER PUBLICATIONS

Huges, Neil, "Apple's Invention for touch-sensitive buttons could prevent accidental inputs", Published online at AppleInsider on May 6, 2014; Retrieved on Apr. 6, 2019 from https://appleinsider.com/articles/14/05/06/apples-concept-for-touch-sensitive-buttons-could-prevent-accidental-inputs.

(Continued)

*Primary Examiner* — Patrick N Edouard
*Assistant Examiner* — Joseph P Fox
(74) *Attorney, Agent, or Firm* — Philip H. Burrus, IV

(57) ABSTRACT

An electronic device includes a touch-sensitive display, one or more processors, and one or more motion sensors. The touch-sensitive display detects touch input at a surface of the touch-sensitive display, with the touch input identifying a user input command requesting performance of a control operation. The one or more motion sensors determine whether the electronic device moves in three-dimensional space while the touch input is occurring. The one or more processors preclude execution of the control operation in response to the touch input where the electronic device moved in the three-dimensional space while the touch input was occurring, thereby preventing control operations in response to inadvertent touching when the electronic device is being picked up or moved.

20 Claims, 9 Drawing Sheets

(56) References Cited

U.S. PATENT DOCUMENTS

| | | | | |
|---|---|---|---|---|
| 10,254,879 | B1* | 4/2019 | Oral | G06F 3/044 |
| 10,572,007 | B2* | 2/2020 | Agarwal | G06K 9/0061 |
| 2003/0034185 | A1* | 2/2003 | Kaikuranta | H04M 1/67 |
| | | | | 178/18.01 |
| 2007/0178911 | A1* | 8/2007 | Baumeister | G01S 5/0252 |
| | | | | 455/456.1 |
| 2011/0117970 | A1* | 5/2011 | Choi | H04M 1/67 |
| | | | | 455/566 |
| 2012/0154294 | A1* | 6/2012 | Hinckley | G06F 1/169 |
| | | | | 345/173 |
| 2012/0158629 | A1* | 6/2012 | Hinckley | G06F 3/0418 |
| | | | | 706/15 |
| 2012/0268249 | A1* | 10/2012 | Kansal | G06F 1/3206 |
| | | | | 340/8.1 |
| 2013/0176264 | A1* | 7/2013 | Alameh | G06F 3/0418 |
| | | | | 345/174 |
| 2013/0265269 | A1* | 10/2013 | Sharma | G06F 3/0416 |
| | | | | 345/173 |
| 2014/0002338 | A1* | 1/2014 | Raffa | G06F 1/1694 |
| | | | | 345/156 |
| 2014/0062892 | A1* | 3/2014 | Dickinson | G06F 3/0412 |
| | | | | 345/173 |
| 2014/0176466 | A1* | 6/2014 | Mizoguchi | G06F 3/041 |
| | | | | 345/173 |
| 2015/0046884 | A1* | 2/2015 | Moore | G06F 3/04883 |
| | | | | 715/863 |
| 2015/0066368 | A1* | 3/2015 | McKenzie | G01C 21/3676 |
| | | | | 701/538 |
| 2015/0355716 | A1* | 12/2015 | Balasubramanian | G06F 3/017 |
| | | | | 345/173 |
| 2015/0370350 | A1* | 12/2015 | Hunt | G06F 3/038 |
| | | | | 345/173 |
| 2016/0036996 | A1* | 2/2016 | Midholt | G06F 1/3231 |
| | | | | 455/567 |
| 2016/0366639 | A1* | 12/2016 | Alameh | H04W 52/0254 |
| 2017/0302784 | A1* | 10/2017 | Okamoto | H04W 4/025 |
| 2018/0157371 | A1* | 6/2018 | Harrison | G06F 3/044 |
| 2019/0250789 | A1* | 8/2019 | Li | G06F 3/048 |
| 2020/0064960 | A1* | 2/2020 | Munemoto | G06F 3/0488 |

OTHER PUBLICATIONS

Madison, Ben, "Prevent Accidental Touches on you Note 9 Device", Published Online by Android Flagship; Retrieved Apr. 6, 2019 at https://androidflaship.com/35807-prevent-accidental-touces-on-your-note-9-device; Published Nov. 2018.

Makvana, Mahesh, "Prevent Accidental Touches on Android", Published online by consumingtech on Apr. 23, 2017; Retrieved Apr. 6, 2019 from https://consumingtech.com/prevent-accidental-touches-on-android/.

Manald, Amboy, "Improve Palm Rejection on Your Galaxy Device to Prevent Accidental Touches", Published Jun. 21, 2018 by Gadget Hacks; Retrieved online Apr. 6, 2019 from https://android.gadgethacks.com/how-to/improve-palm-rejection-your-galaxy-device-prevent-accidental-touches-0185354/.

Rehman, A, "No Touch: Prevent Accidental Touches While Watching Movies or Reading [Androids]", Published by Addictive Tips online on Jan. 6, 2012; Retrieved Apr. 6, 2019 from https://www.addictivetips.com/mobile/no-touch-prevent-accidental-touches-while-watching-movies-android/.

* cited by examiner

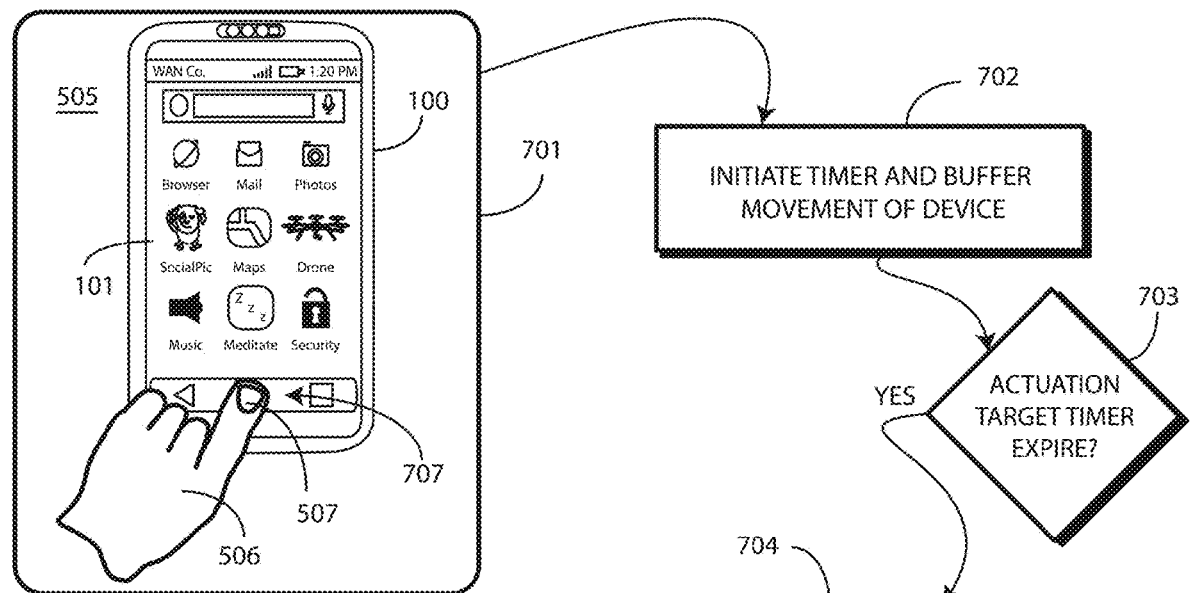
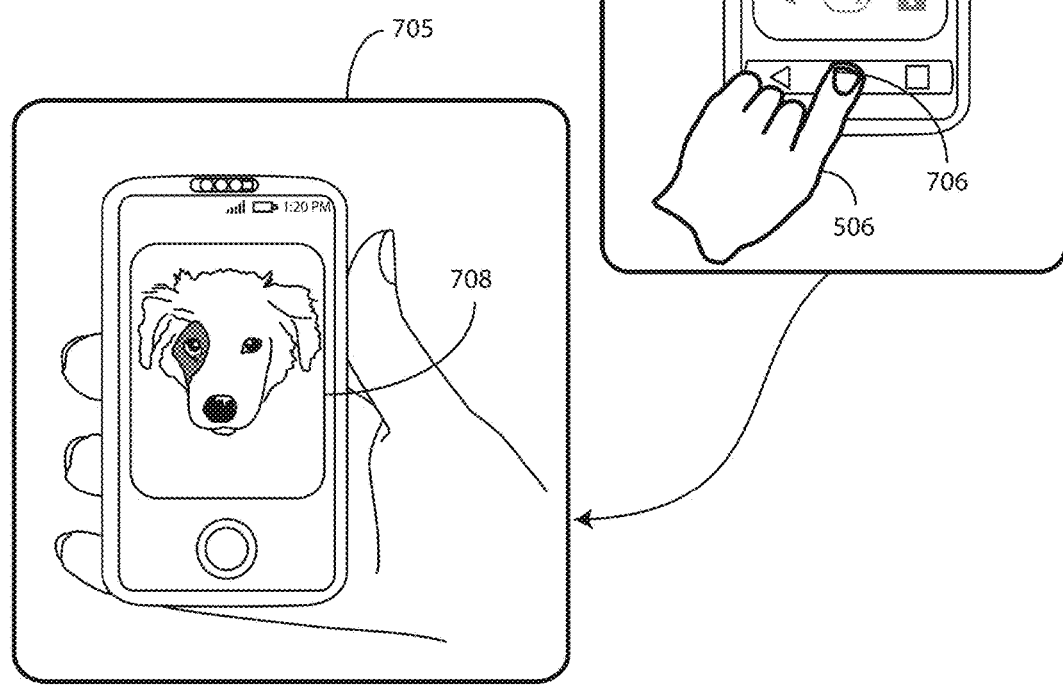
FIG. 7

METHODS AND DEVICES FOR PRECLUDING TOUCH INITIATED CONTROL OPERATIONS DURING THREE-DIMENSIONAL MOTION

BACKGROUND

Technical Field

This disclosure relates generally to electronic devices and corresponding methods, and more particularly to electronic devices with touch sensors.

Background Art

The use of portable electronic devices has become ubiquitous. People use smartphones, tablet computers, gaming devices, and media players throughout the day to communicate with others, stay informed, and for entertainment.

As the technology of these devices has advanced, so too has their feature set. For example, not too long ago most electronic devices had physical keypads. Today touch sensitive displays are more frequently seen as user interface devices. While touch sensitive displays have become more intuitive to use, problems can arise when inadvertent touching initiates an errant phone call or launches an application. It would be advantageous to have an improved electronic device that helped eliminate unwanted device operations in response to inadvertent touching of a touch sensitive display or surface.

BRIEF DESCRIPTION OF THE DRAWINGS

FIG. 7 illustrates another explanatory method in accordance with one or more embodiments of the disclosure.

Figure 1:
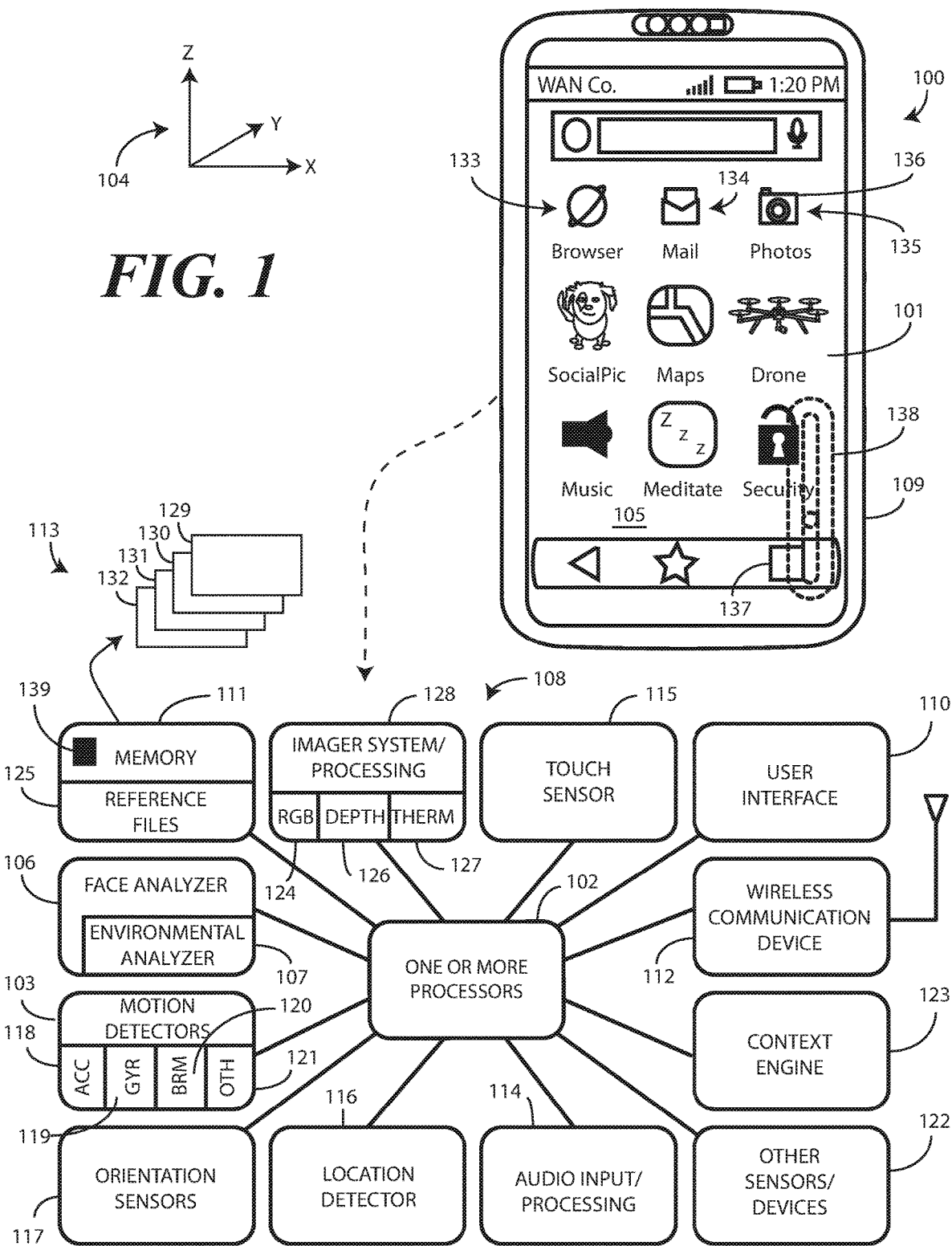
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to precluding one or more processors from executing a control operation in response to a user command when one or more motion sensors of the electronic device detect movement of the electronic device in three-dimensional space while the touch-sensitive display is being touched. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of precluding performance of a control operation in response to a touch input initiated user command when the electronic device moves in more than two dimensions in free space as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the preclusion of control operations during lifting motions as well. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that people frequently release an electronic device, e.g., by placing the electronic device on a table, while that electronic device in an active state or active mode of operation. For instance, a user may place a smartphone on a table or nightstand while its touch sensitive display is in an active mode of operation, and while the electronic device is unlocked.

The reasons for doing so can vary. A person may simply forget to lock the electronic device before placing it on the table. Alternatively, they may intend to only put the electronic device down momentarily, and therefore believe locking the electronic device to be cumbersome or unnecessary. The person may be watching content, such as a video or movie, and may want to continue doing so when the electronic device is placed on the table. Other reasons for releasing an unlocked device with a touch-sensitive surface in an active mode of operation will be obvious to those of ordinary skill in the art having the benefit of this disclosure.

Regardless of the reason for putting down the electronic device with the touch-sensitive display or surface remaining active, this situation can create problems when the user wants to again pick the device up. For example, when grasping the electronic device with a hand, the person may inadvertently touch the touch-sensitive display. This may cause an unwanted consequence such as causing an active application to change, stopping a video, initiating an unwanted phone call, or causing other actions to occur. With prior art devices, the only way to prevent this from occurring would be to lock the display prior to grasping the electronic device, or alternatively for the user to attempt to grasp the electronic device only by the edges. The former technique is inefficient, as the person must interrupt the current operational mode by locking, and then unlocking, the electronic device. The latter technique is dangerous, in that an insufficient grip can cause the electronic device to be dropped, which can result in expensive damage to the device.

Embodiments of the disclosure provide a solution to this problem by precluding control operations in response to user commands stemming from touch input at a touch-sensitive surface of an electronic device when one or more motion sensors detect the electronic device moving by more than a predefined threshold in more than two dimensions in free space while the touch input is occurring. Embodiments of the disclosure thus allow a person to grasp an electronic device that has a touch-sensitive display or other surface in an active mode of operation, and lift the electronic device from a surface, without inadvertently causing unwanted device operational actions to occur. Advantageously, embodiments of the disclosure provide methods and devices that allow a person to pick up an electronic device with a touch-sensitive surface in an active mode of operation in a more natural way without worrying about inadvertently causing unintentional control operations to occur on the electronic device.

In one or more embodiments, a method in an electronic device includes receiving, as touch input on a touch-sensitive display or other touch sensitive surface of the electronic device, a user input command to perform a control operation from an object touching the touch-sensitive display or other touch sensitive surface. For example, a user actuation target corresponding to a particular application may be touched, which in ordinary situations would cause the application to launch.

In one or more embodiments, one or more motion sensors of the electronic device then determine whether the electronic device moves in three-dimensional space while the object is touching the touch-sensitive display. In one or more embodiments, when the electronic device moves in three-dimensional space by at least a predefined threshold while the object is or was touching the touch-sensitive display or other touch sensitive surface, or alternatively where the electronic device is lifted with its elevation changing in a direction opposite gravity, one or more processors of the electronic device preclude execution of the control operation in response to the user input command. Continuing the example above, if the person had touched a user actuation target while lifting the electronic device, the one or more processors would preclude the launch of the application in response to the touch input due to the fact that the electronic device was lifted while the touch input occurred.

Illustrating by way of another example, presume a person is watching a movie on a smartphone that includes a touch-sensitive display. Now presume that the person needs to momentarily place the smartphone on a kitchen counter top to wash their hands. If the person desires to continue watching the movie while washing their hands, the touch-sensitive display will remain in an active and unlocked state.

Once the person is finished washing their hands, they face a dilemma. When picking up the electronic device, if they inadvertently touch the touch-sensitive display the movie may stop, start to fast forward, or start to rewind, depending upon whether the person inadvertently touches the stop, fast forward, or rewind user actuation targets presented on the display. Alternatively, the movie playing application may be closed if the person inadvertently launches another application.

Embodiments of the disclosure provide a solution to this dilemma by allowing the person to grasp the electronic device naturally. If they inadvertently touch the touch-sensitive display, even if they touch a user actuation target, in one or more embodiments one or more processors of the smartphone preclude performing control operations where one or more motion sensors of the electronic device detect the electronic device moving in three-dimensional space. Thus, if the person grasps the electronic device and inadvertently touches the stop user actuation target while picking the electronic device up off of the counter top, in one or more embodiments the movie simply continues playing because the control operation of stopping the movie is precluded due to the fact that the three-dimensional motion occurred.

Advantageously, when an electronic device is configured in accordance with one or more embodiments of the disclosure, the person need not worry about performing unintended actions, e.g., stopping the movie in this example, while picking up the electronic device and touching the touch-sensitive display or surface. Moreover, as illustrated by this example, grasping and lifting the electronic device while also touching the touch-sensitive display or surface will not interrupt the content being presented on the touch-sensitive display. What's more, embodiments of the disclosure do not require any special movements, commands, or other unnatural actions by the person. Instead, the intuitive act of simply grasping and lifting the electronic device can occur without worry of inadvertently causing unwanted control operations to occur due to the automatic preclusion of control operations in such situations.

In one or more embodiments, when an electronic device is detected as being stationary on a surface, in an unlocked mode of operation with a touch-sensitive display or surface in an active mode, embodiments of the disclosure are enabled to prevent false touch control operation performance during device grasping and/or lifting. In such a situation, the electronic device monitors, with the one or more motion sensors, motion of the electronic device while the object is touching the touch-sensitive display, as well as optionally storing, with one or more processors, a data representation of the motion of the electronic device in a memory of the electronic device.

In one or more embodiments, if the electronic device experiences any of an absence of motion, motion in one-dimensional space, or motion in two-dimensional space (as would be the case if the electronic device slides across a flat surface such as a table top) while the person touches the touch-sensitive display, the one or more processors will execute the corresponding control operation. By contrast, if the electronic device experiences motion in three-dimensional space, embodiments of the disclosure conclude that the person is grasping and/or lifting (or lowering, such as from an elevated shelf) the electronic device. In other embodiments, when continuous motion in three directions is detected, and displacement movement estimated from accelerometers is large enough, e.g., larger than a predefined threshold in one direction, embodiments of the disclosure conclude that the person is grasping and/or the electronic device. Where this occurs, the one or more processors ignore the touch input and preclude the performance of the corresponding control operation. Once this preclusion occurs, e.g., once the person has picked up the electronic device, the electronic device returns to a normal mode of operation with the touch-sensitive display subsequently responding to any touch input.

Where the electronic device experiences motion in three-dimensional space, in one or more embodiments one or more processors of the electronic device confirm, using one or more motion sensors of the electronic device, whether the electronic device moved in three-dimensional space beyond at least a predefined threshold while the object is touching the touch-sensitive display. Embodiments of the disclosure contemplate that a grasping action may cause the electronic device to make micro-movements in the three-dimensional space even when the electronic device is not being lifted. Additionally, if the electronic device has a curved housing or form factor, it may rock back and forth when being touched. Similarly, if a stand or other prop is supporting the electronic device, the electronic device may rock or pivot on the stand. Accordingly, in one or more embodiments movement of the electronic device in the three-dimensional space is confirmed only when the movement exceeds a predefined threshold such as at least one inch in the vertical direction (a direction opposite the gravitational pull of the earth), at least two inches in the vertical direction, at least three inches in the vertical direction, and so forth. Other predefined thresholds will be obvious to those of ordinary skill in the art having the benefit of this disclosure.

Turning now to FIG. 1, illustrated therein is one explanatory electronic device 100 configured in accordance with one or more embodiments of the disclosure. It should be noted that the electronic device 100 includes many components that are optional, but which are included in an effort to demonstrate how varied electronic devices configured in accordance with embodiments of the disclosure can be.

Illustrating by example, in one or more embodiments the electronic device 100 includes a touch-sensitive display 101, one or more processors 102 operable with the touch-sensitive display 101, and one or more motion sensors 103 operable with the one or more processors 102. The touch-sensitive display 101 detects touch input at a surface 105 of the touch-sensitive display, with the touch input identifying a user input command requesting performance of a control operation. The one or more motion sensors 103 determine whether the electronic device 100 moves in three-dimensional space 104 while the touch input is occurring, and the one or more processors 102 preclude execution of the control operation in response to the touch input where the electronic device 100 moved in the three-dimensional space 104 while the touch input was occurring.

In such an embodiment, a component such as a face analyzer 106 or an environmental analyzer 107 would be optional, in that neither is mandatory to prevent false touch prevention in the electronic device 100 in accordance with this method. Thus, it is to be understood that FIG. 1 is provided for illustrative purposes only and for illustrating components of one electronic device 100 in accordance with embodiments of the disclosure, and is not intended to be a complete schematic diagram of the various components required for an electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

A block diagram schematic 108 of the electronic device 100 is also shown in FIG. 1. It should be noted that the electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the block diagram schematic 108 could be used with other devices as well, including palm-top computers, tablet computers, gaming devices, media players, wearable devices, or other portable wireless communication devices. Still other devices will be obvious to those of ordinary skill in the art having the benefit of this disclosure.

In one or more embodiments, the block diagram schematic 108 is configured as a printed circuit board assembly disposed within a housing 109 of the electronic device 100. Various components can be electrically coupled together by conductors or a bus disposed along one or more printed circuit boards.

The illustrative block diagram schematic 108 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 108 includes a user interface 110. In one or more embodiments, the user interface 110 includes the touch-sensitive display 101. In one embodiment, users can deliver user input commands to perform control operations to the touch-sensitive display 101 by delivering touch input from a finger, stylus, or other objects disposed proximately with the touch-sensitive display 101. The one or more processors 102 then interpret this touch input as a user input command to perform a control operation. For example, if a person touches the surface 105 of the touch-sensitive display at a user actuation target 136 corresponding to an application, the one or more processors 102 may interpret this touch input as a user input command to launch the application, and so forth.

In one embodiment, the touch-sensitive display 101 is configured as an active matrix organic light emitting diode (AMOLED) display. However, it should be noted that other types of displays, including liquid crystal displays, suitable for use with the user interface 110 would be obvious to those of ordinary skill in the art having the benefit of this disclosure.

In one embodiment, the electronic device includes one or more processors 102. In one embodiment, the one or more processors 102 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 108. Each of the application processor and the auxiliary processor(s) can be configured to process and execute executable software code to perform the various functions of the electronic device with which the block diagram schematic 108 operates. A storage device, such as memory 111, can optionally store the executable software code used by the one or more processors 102 during operation.

In this illustrative embodiment, the block diagram schematic 108 also includes a wireless communication circuit 112 that can be configured for wired or wireless communication with one or more other devices or networks. The networks can include a wide area network, a local area network, and/or personal area network. The wireless communication circuit 112 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The wireless communication circuit 112 can include wireless communication circuitry, one of a receiver, a transmitter, or transceiver, and one or more antennas.

In one embodiment, the one or more processors 102 can be responsible for performing the primary functions of the electronic device with which the block diagram schematic 108 is operational. For example, in one embodiment the one or more processors 102 comprise one or more circuits operable with the user interface 110 to present presentation information to a user. The executable software code used by the one or more processors 102 can be configured as one or more modules 113 that are operable with the one or more processors 102. Such modules 113 can store instructions, control algorithms, and so forth.

In one or more embodiments, the one or more processors 102 are responsible for running the operating system environment 129. The operating system environment 129 can include a kernel 130 and one or more drivers, and an application service layer 131, and an application layer 132. The operating system environment 129 can be configured as executable code operating on the one or more processors 102 or other control circuits of the electronic device 100.

The application layer 132 can be responsible for executing application service modules. The application service modules may support one or more applications or "apps." Examples of such applications shown in FIG. 1 include a web browsing application 133 configured to allow the user to view webpages on the touch-sensitive display 101 of the electronic device 100, an electronic mail application 134 configured to send and receive electronic mail, and a photo application 135 configured to permit the user to view images or video on the touch-sensitive display 101 of electronic device 100. These applications are illustrative only. Others are shown in FIG. 1. Still others will be obvious to one of ordinary skill in the art having the benefit of this disclosure.

The applications of the application layer 132 can be configured as clients of the application service layer 131 to communicate with services through application program interfaces (APIs), messages, events, or other inter-process communication interfaces. Where auxiliary processors are used, they can be used to execute input/output functions, actuate user feedback devices, and so forth.

In the illustrative embodiment of FIG. 1, the applications of the application layer 132 are presented on the touch-sensitive display 101 as user actuation targets. The user actuation targets are virtual buttons or keys or visual targets that, when touch input is received on the surface 105 of the touch-sensitive display 101 above the user actuation target, cause a control operation to be performed. Illustrating by example, touching the user actuation target 136 shaped like a camera for the photo application 135 causes, in one or more embodiments, the photo application 135 to launch and present photographs on the surface 105 of the touch-sensitive display 101. Effectively, in one or more embodiments the user actuation targets identify locations along the surface 105 of the touch-sensitive display 101 that, when touch input is received at that location, cause the touch input to be identified as a user command to perform a control operation, e.g., launching an application.

In one or more embodiments, the user actuation targets are divided into two types of user actuation targets. A first type of user actuation target, e.g., user actuation target 136, is a standard mode user actuation target. With standard mode user actuation targets, simply delivering touch input to the location of the standard mode user actuation target on the surface 105 of the touch-sensitive display 101, and optionally releasing the surface 105 thereafter, delivers a user input command requesting performance of a control operation. Thus, again using the example of the user actuation target 136 for the photo application 135, touching and releasing the surface 105 of the touch-sensitive display 101 at the location of the user actuation target 136 could comprise a user input command requesting performance of a control operation such as launching the photo application 135.

In one or more embodiments, a second type of user actuation target is referred to as an extended touch mode user actuation target. One example of such an extended touch mode user actuation target is shown in FIG. 1 as user actuation target 137. With an extended touch mode user actuation target, delivering touch input at the location of the extended mode user actuation target for at least a predefined amount of time, e.g., two seconds, results in that user input command requesting a secondary control operation to occur.

Illustrating by example, in the explanatory embodiment of FIG. 1 touching the surface 105 of the touch-sensitive display 101 at user actuation target 137 and releasing it may cause music to stop. However, touching the surface 105 of the touch-sensitive display 101 at user actuation target 137 for at least a predefined amount of time, e.g., one or two seconds, may cause a secondary function to become available. In the illustrative embodiment of FIG. 1, the secondary function is the presentation of a volume control 138 with which a user can adjust the volume of music playing.

Figure 3:
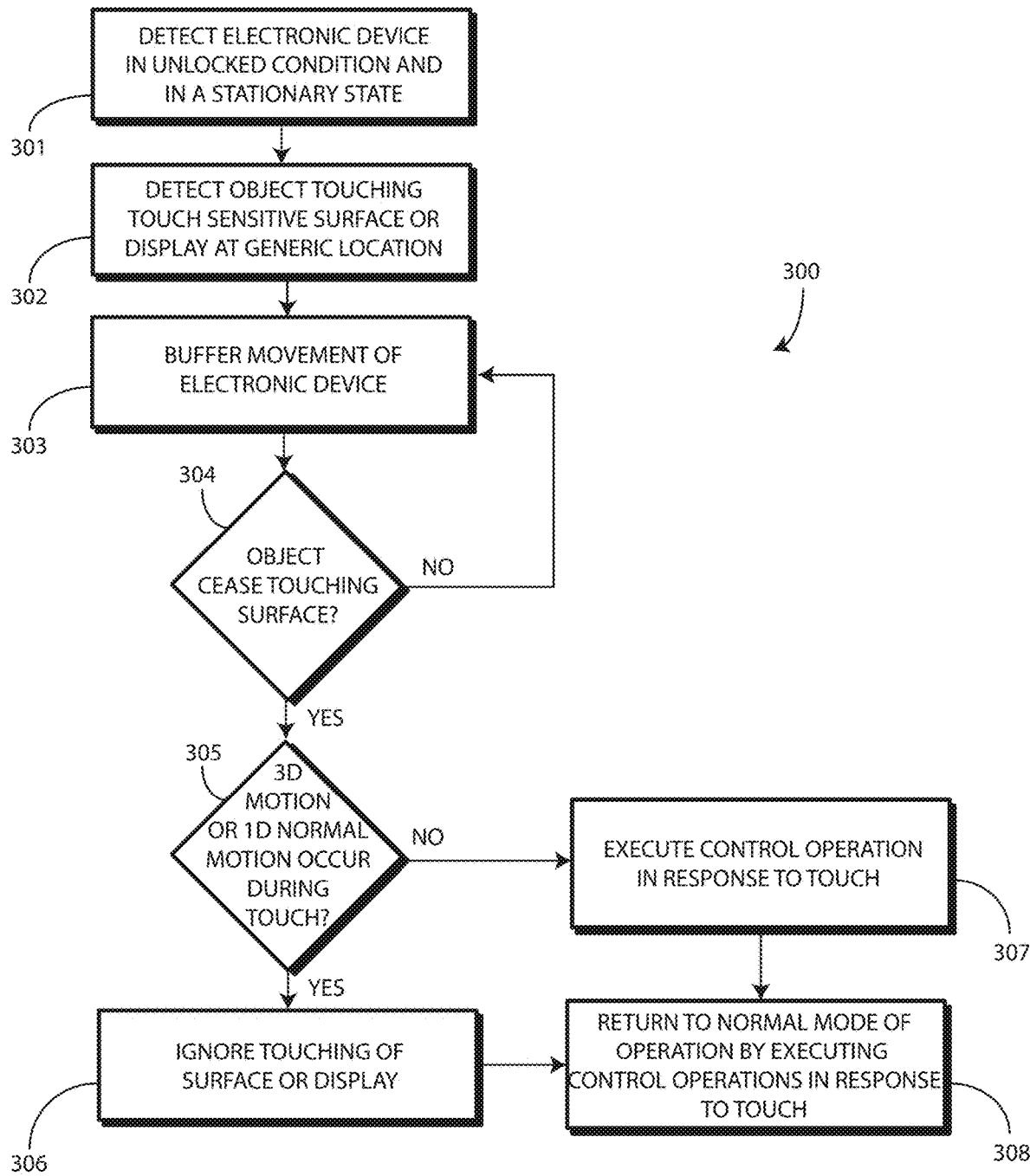
FIG. 3 illustrates another explanatory method for an electronic device in accordance with one or more embodiments of the disclosure.
Figure 4:
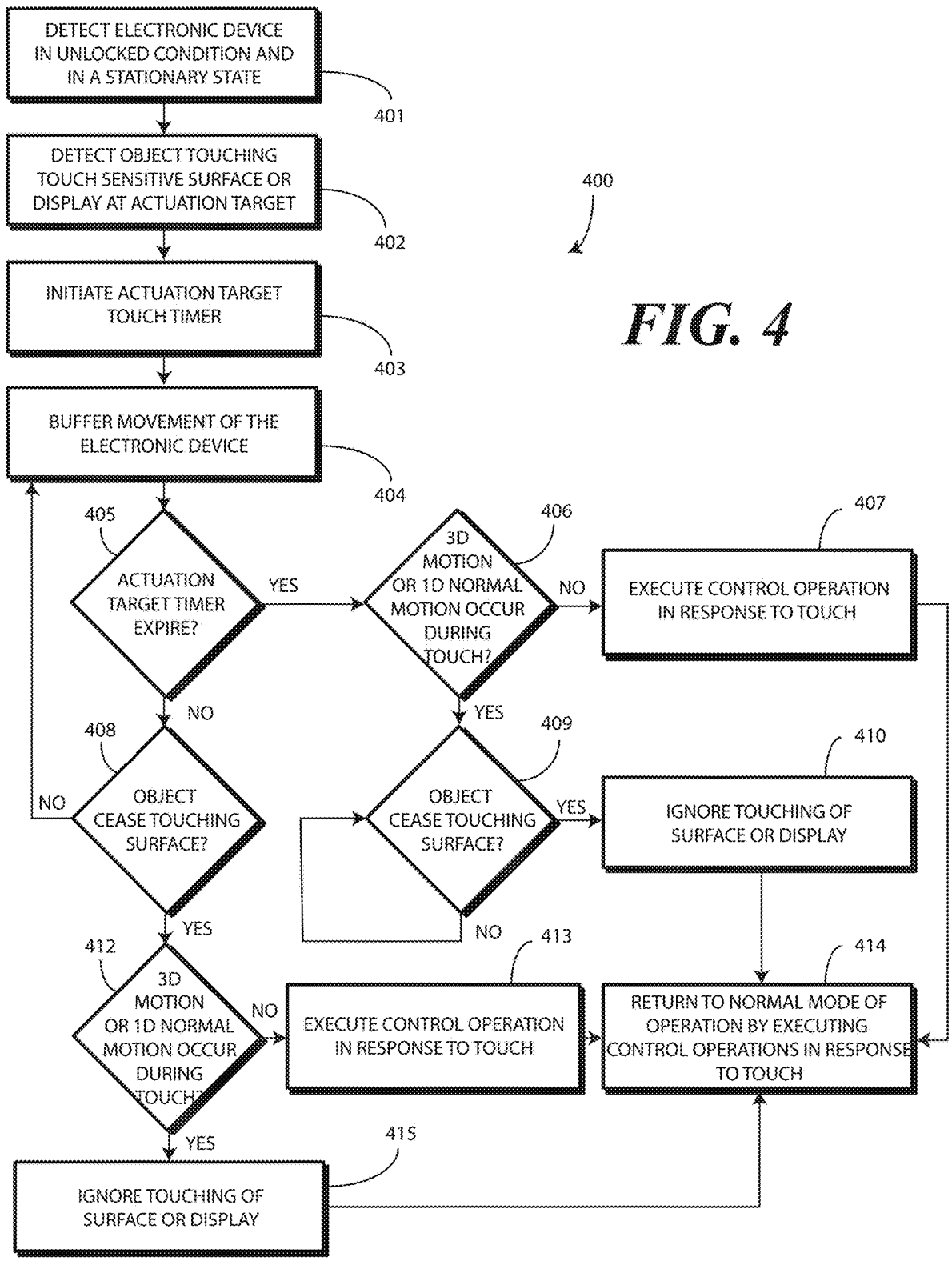
FIG. 4 illustrates yet another explanatory method in accordance with one or more embodiments of the disclosure.

Accordingly, in one or more embodiments a standard mode user actuation target, when touched, performs a single function, e.g., launching an application. By contrast, an extended touch mode user actuation target provides for multiple functions, with a first being performed when the extended touch mode user actuation target is touched for an amount of time less than a predefined threshold, and a second function being performed when the extended touch mode user actuation target is touched for an amount of time exceeding the predefined threshold. Examples of how each are handled by embodiments of the disclosure will be explained in more detail below with reference to FIGS. 3 and 4, with FIG. 3 illustrating one explanatory method for standard mode user actuation targets and FIG. 4 illustrating one explanatory method for extended touch mode user actuation target.

Returning to the block diagram schematic 108, in one or more embodiments, the block diagram schematic 108 includes an audio input/processor 114. The audio input/processor 114 can include hardware, executable code, and speech monitor executable code in one embodiment. The audio input/processor 114 can include, stored in memory 111, basic speech models, trained speech models, or other modules that are used by the audio input/processor 114 to receive and identify voice commands that are received with audio input captured by an audio capture device. In one embodiment, the audio input/processor 114 can include a voice recognition engine. Regardless of the specific implementation utilized in the various embodiments, the audio input/processor 114 can access various speech models to identify speech commands. In one embodiment, the audio input/processor 114 is configured to implement a voice control feature that allows a user to speak a specific device command to cause the one or more processors 102 to execute a control operation.

Various sensors can be operable with the one or more processors 102. FIG. 1 illustrates several examples such sensors. It should be noted that those shown in FIG. 1 are not comprehensive, as others will be obvious to those of ordinary skill in the art having the benefit of this disclosure. Additionally, it should be noted that the various sensors shown in FIG. 1 could be used alone or in combination. Accordingly, many electronic devices will employ only subsets of the sensors shown in FIG. 1, with the particular subset defined by device application.

A first example of a sensor that can be included with the electronic device 100 is a touch sensor 115. The touch sensor 115 can include a capacitive touch sensor, an infrared touch sensor, an inductive touch sensor, a thermal touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 102, to detect an object in close proximity with—or touching—the surface 105 of the touch-sensitive display 101 or another touch-sensitive surface positioned along the housing 109 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor is a geo-locator that serves as a location detector 116. In one embodiment, location detector 116 is able to determine location data of the electronic device 100 by capturing the location data from a constellation of one or more earth orbiting satellites, or from a network of terrestrial base stations to determine an approximate location. The location detector 116 may also be able to determine location by locating or triangulating terrestrial base stations of a traditional cellular network, such as a CDMA network or GSM network, or from other local area networks, such as Wi-Fi networks.

One or more motion sensors 103 can be configured as an orientation detector 117 that determines an orientation and/or movement of the electronic device 100 in three-dimensional space 104. Illustrating by example, the one or more motion sensors 103 can include an accelerometer 118, one or more gyroscopes 119, a barometer 120, camera, or other devices 121 to detect device orientation and/or motion of the electronic device 100. Using an accelerometer 118 as an example, an accelerometer 118 can be included to detect motion of the electronic device. Additionally, the accelerometer 118 can be used to sense some of the gestures of the user, such as one talking with their hands, running, or walking. The one or more motion sensors 103 can optionally include a barometer 120 operable to sense changes in air pressure due to elevation changes or differing pressures of the electronic device 100.

In one or more embodiments, the orientation detector 117 can determine the spatial orientation of an electronic device 100 in three-dimensional space 104 by, for example, detecting a gravitational direction. In addition to, or instead of, an accelerometer 118, an electronic compass can be included as one of the other devices 121 to detect the spatial orientation of the electronic device 100 relative to the earth's magnetic field. Similarly, one or more gyroscopes 119 can be included to detect rotational orientation of the electronic device 100.

Other components 122 operable with the one or more processors 102 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

A context engine 123 can then operable with the various sensors and components to detect, infer, capture, and otherwise determine persons and actions that are occurring in an environment about the electronic device 100. For example, where included one embodiment of the context engine 123 determines assessed contexts and frameworks using adjustable algorithms of context assessment employing information, data, and events. These assessments may be learned through repetitive data analysis. Alternatively, a user may employ the user interface 110 to enter various parameters, constructs, rules, and/or paradigms that instruct or otherwise guide the context engine 123 in detecting multi-modal social cues, emotional states, moods, and other contextual information. The context engine 123 can comprise an artificial neural network or other similar technology in one or more embodiments.

In one or more embodiments, the context engine 123 is operable with the one or more processors 102. In some embodiments, the one or more processors 102 can control the context engine 123. In other embodiments, the context engine 123 can operate independently. The context engine 123 can receive data from the various sensors. In one or more embodiments, the one or more processors 102 are configured to perform the operations of the context engine 123.

In one or more embodiments, the electronic device 100 includes an imager 124. In one embodiment, the imager 124 comprises a two-dimensional imager configured to receive at least one image of a person within an environment of the electronic device 100. In one embodiment, the imager 124 comprises a two-dimensional Red-Green-Blue (RGB) imager. In another embodiment, the imager 124 comprises an infrared imager. Other types of imagers suitable for use as the imager 124 will be obvious to those of ordinary skill in the art having the benefit of this disclosure.

In one or more embodiments, the imager 124 is operable to capture at least one image of an object situated within a predefined radius of the electronic device 100. In one or more embodiments, the images captured by the imager 124 can be compared to one or more predefined reference files 125 stored in the memory 111. By making such a comparison, one or more processors 102 can confirm whether the shape, skin tone, eye color, hair color, hair length, and other features identifiable in a two-dimensional image are that of an authorized user identified by the one or more predefined reference images stored in the predefined reference files 125.

In addition to the imager 124, in one or more embodiments the electronic device 100 includes a depth imager 126. In one illustrative embodiment, the depth imager 126 comprises a time of flight device having a signal emitter and a signal receiver. In another embodiment, the depth imager 126 employs a structured light laser or infrared light device. In one or more embodiments the depth imager 126 can obtain a three-dimensional mapping of a surface. Accordingly, the use of a depth imager 126 adds a third "z-dimension" to the x-dimension and y-dimension defining the two-dimensional image captured by the imager 124. This three-dimensional aspect can enhance, for example, the security of using a person's face as their password in the process of authentication by facial recognition.

The electronic device 100 can include a thermal sensor 127. The thermal sensor 127 can take various forms. In one embodiment, the thermal sensor 127 is simply a proximity sensor component. In another embodiment, the thermal sensor 127 comprises a simple thermopile, can also act as a proximity sensor. In another embodiment, the thermal sensor 127 comprises an infrared imager that captures the amount of thermal energy emitted by an object. Other types of thermal sensors will be obvious to those of ordinary skill in the art having the benefit of this disclosure.

When operating with one or both of the imager 124 and/or the depth imager 126, the thermal sensor 127 can assist in operating as an authentication device. Illustrating my example, in one or more embodiments one or more processors 102 compare the images captured by the imager 124 with the one or more predefined reference files 125, e.g., reference images, stored in memory 111. The one or more processors 102 can then compare depth scans created by the depth imager 126 with other predefined reference files 125, e.g., facial maps, stored in the memory 111. The one or more processors 102 can compare temperature readings obtained by the thermal sensor 127 to predefined temperature ranges corresponding to human skin stored in the memory 111, and so forth. Accordingly, one or more of the imager 124, the depth imager 126, and/or the thermal sensor 127 can be used as an authentication device.

A face analyzer 106 and/or environmental analyzer 107 can be configured to process an image or depth scan of an object and determine whether the object matches predetermined criteria. For example, the face analyzer 106 and/or environmental analyzer 107 can operate as an identification module configured with optical and/or spatial recognition to identify objects using image recognition, character recognition, visual recognition, facial recognition, color recognition, shape recognition, and the like. Advantageously, the face analyzer 106 and/or environmental analyzer 107, operating in tandem as a component of an authentication system, can be used as a facial recognition device to determine the identity of one or more persons detected about the electronic device 100.

In one or more embodiments, the face analyzer 106 can also include an image/gaze detection-processing engine. The image/gaze detection-processing engine can process information to detect a user's gaze point. The image/gaze detection-processing engine can optionally also work with the depth scans to detect an alignment of a user's head in three-dimensional space 104. Electronic signals can then be delivered from the imager 124 or the depth imager 126 for computing the direction of user's gaze in three-dimensional space 104. The image/gaze detection-processing engine 128 can further be configured to detect a gaze cone corresponding to the detected gaze direction, which is a field of view within which the user may easily see without diverting their eyes or head from the detected gaze direction. The image/gaze detection-processing engine 128 can be configured to alternately estimate gaze direction by inputting images representing a photograph of a selected area near or around the eyes. It can also be valuable to determine if the user wants to be authenticated by looking directly at device. The image/gaze detection-processing engine 128 can determine not only a gazing cone but also if an eye is looking in a particular direction to confirm user intent to be authenticated.

Figure 2:
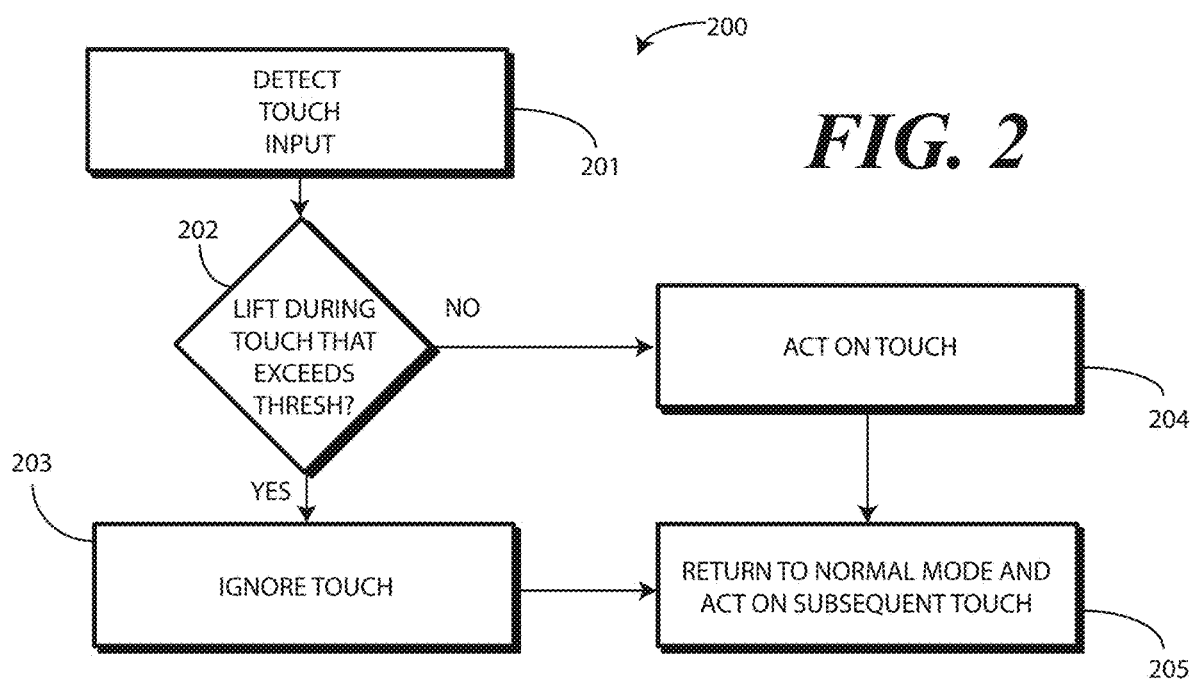
FIG. 2 illustrates one explanatory method for an electronic device in accordance with one or more embodiments of the disclosure.

Now that various hardware components have been described, attention will be turned to methods of using electronic devices in accordance with one or more embodiments of the disclosure. Turning now to FIG. 2, illustrated therein is one explanatory general method 200 for using the electronic device (100) of FIG. 1 to preclude control operations in response to user input commands delivered by objects touching a touch-sensitive display (101) of the electronic device (100) during device lifting in accordance with one or more embodiments of the disclosure. More detailed methods will be described thereafter with reference to FIGS. 3 and 4.

Beginning at step 201, the method 200 receives, as touch input at the touch-sensitive display (101) of the electronic device (100), a user input command to perform a control operation from an object touching the touch-sensitive display (101). In one or more embodiments, step 201 occurs when the electronic device (100) is in an unlocked mode of operation where the touch-sensitive display (101) is presenting one or more user actuation targets which, if touched, would ordinarily cause performance of a control operation without the additional user authentication requirements such as passcode entry, pin code entry, facial recognition, fingerprint recognition, voice recognition, or other techniques.

The object delivering the touch input at step 201 can take various forms. For instance, the object may be a finger, stylus, or other object to which the touch sensor (115) is responsive. Illustrating by example, as noted above one or more processors (102) of the electronic device (100) can present one or more user actuation targets along the touch-sensitive display (101). The user actuation targets can identify locations along the surface (105) of the touch-sensitive display (101) that, when touch input is received at that location, cause the touch input to be identified as a user command to perform a control operation, e.g., launching an application. A user may deliver this touch input, for example, by placing a finger on the surface (105) of the touch-sensitive display (101) at a location identified by a user actuation target. In one or more embodiments, the touch-sensitive display (101) receives such touch input at step 201 of the method 200 of FIG. 2.

At decision 202, the method 200 determines, using one or more motion sensors (103) of the electronic device (100), whether the electronic device (100) moves in three-dimensional space (104) while the object is touching the touch-sensitive display (101). In one or more embodiments, decision 202 determines whether the electronic device (100) moves in three-dimensional space (104) beyond at least a predefined threshold while the object is touching the touch-sensitive display (101). On the outside chance that a person could lift the electronic device (100) in a perfectly vertical, one-dimensional motion, embodiments of the disclosure could also, at decision 202, be modified to determine whether the electronic device (100) moved in one dimension against the direction of gravity as well. Embodiments of the disclosure contemplate that a grasping action may cause the electronic device (100) to make micro-movements in the three-dimensional space (104) without being lifted. Accordingly, in one or more embodiments decision 202 indicates movement of the electronic device (100) in the three-dimensional space (104) only when the movement exceeds a predefined threshold such as at least one inch in the vertical direction (a direction opposite the gravitational pull of the earth, as represented by the Z-axis in FIG. 1), at least two inches in the vertical direction, at least three inches in the vertical direction, and so forth. Other predefined thresholds will be obvious to those of ordinary skill in the art having the benefit of this disclosure.

Decision 202 can determine whether the electronic device (100) moves in three-dimensional space (104) while the object is touching the touch-sensitive display (101) in a variety of ways. Illustrating by example, in one or more embodiments one or more processors (102) of the electronic device (100) can determine such movement from information received from the accelerometer (118). For instance, in one or more embodiments the accelerometer (118) can determine an acceleration occurring in three dimensions during movement of the electronic device (100) by a person.

This simply technique allows for a quick determination of movement in three dimensions. However, as described below additional confirmation operations can be performed to confirm that the movement in three-dimensional space (104) was in response to a lifting (or lowering) gesture, rather than another motion. In one or more embodiments the precluding steps described with reference to FIGS. 2-4 occur only when the movement in three-dimensional space (104) during the touch input is in response to a lifting or lowering gesture.

It should be noted that embodiments of the disclosure contemplate that in most scenarios to which the preclusion operations are relevant, the electronic device (100) will move in the three-dimensional space (104) in response to a lifting operation. For example, a person may lift the electronic device (100) from a surface, such as a table or counter top. Accordingly, much of the discussion below is directed to performing additional operations to confirm that motion in the three-dimensional space (104) occurs in response to lifting gestures. However, it should be noted that embodiments of the disclosure are not so limited. Reversing the conventions or calculations of the techniques and confirmation methods below can be used to determine three-dimensional motion in a downward direction as well, such as if a person were retrieving the electronic device (100) from an elevated shelf, for example.

In one or more embodiments an acceleration determination from the accelerometer (118) can then be further used in multiple ways to determine whether the three-dimensional motion was in response to a lifting gesture, or alternatively in response to another motion. For instance, the acceleration determination can be used to confirm that the motion moving the electronic device (100) occurred against the direction of gravity, as would be the case when lifting the electronic device (100), but not when, for example, sliding the electronic device (100) along a desk surface. Second, by comparing the acceleration measurement to a predetermined threshold, the acceleration magnitude can be used to confirm that a user is actually lifting the electronic device (100) rather than performing some other operation, such as sliding the electronic device (100) along a surface that is not orthogonal with the direction of gravity, e.g., a slanted or tilted tabletop.

Thus, in addition to simply monitoring an accelerometer (118) to determine whether the electronic device (100) moves in three-dimensional space (104) while the object is touching the touch-sensitive display (101), the one or more processors (102) can perform additional functions to confirm that such movement is the result of a lifting gesture performed by a person rather than another action in one or more embodiments. For example, in one or more embodiments the one or more processors (102) can determine an orientation of the electronic device (100) once movement of the electronic device (100) in three-dimensional space (104) has been detected by the accelerometer (118). An illustrative lifting operation might move the electronic device (100) from a first location, such as when the electronic device (100) is on a desk or tabletop, to a second location, such as when the person is looking at the electronic device (100) with the same being at a waist high, chest high, or chin high level. In one or more embodiments to confirm that such a lifting operation has occurred, embodiments of the disclosure confirm one or more secondary factors in addition to movement. Of course, this is but one orientation of the electronic device that could occur at the end of lifting.

During lift, the orientation of the electronic device could be other than that described here.

In one embodiment, a secondary factor that can be confirmed is that at least a component of the direction of gravity runs from a first end of the electronic device (100) to a second end of the electronic device (100). For instance, the first end may be the top of the electronic device (100) as viewed in FIG. 1 where the earpiece speaker is located, while the second end may be the bottom of the electronic device (100) as viewed in FIG. 1 where the microphone is located. Embodiments of the disclosure contemplate that if a person is holding the electronic device (100) and viewing the touch-sensitive display (101) as shown in FIG. 1, the end of the electronic device (100) where the earpiece speaker is located will be higher than end of the electronic device where the microphone is situated.

Other confirmation factors can be used as well. For example, in one embodiment the one or more processors (102) are to confirm that a gesture lifting the electronic device (100) occurs where the amount of movement exceeds a first predetermined threshold. In one embodiment, this first predetermined threshold is about 20 centimeters. Other thresholds will be obvious to those of ordinary skill in the art having the benefit of this disclosure.

In one embodiment, the one or more processors (102) are further to confirm that a gesture lifting the electronic device (100) occurs where the amount of rotation of the electronic device (100) about a reference axis normal to the surface (105) of the touch-sensitive display (101) exceeds a second predetermined threshold. In one embodiment, the second predetermined threshold is about forty-five degrees. Other thresholds will be obvious to those of ordinary skill in the art having the benefit of this disclosure.

In one embodiment, the one or more processors (102) are further to confirm the gesture lifting the electronic device (100) occurred when an acceleration of the electronic device (100) during the movement exceeds a third predetermined threshold. In one embodiment, this predetermined threshold is 0.5 meters per second squared, net of any acceleration due to gravity. Other thresholds will be obvious to those of ordinary skill in the art having the benefit of this disclosure.

The factors listed above can be used in the function determining whether the gesture lifting the electronic device (100) in three-dimensional space (104) occurred alone, in combination, or not at all. For example, the function can consider none, one, two, three, or all of the factors. Considering more factors assists in preventing false detection of the gesture. Embodiments of the disclosure contemplate that a person should be minimally affected due to false detection. Accordingly, in one embodiment the one or more processors (102) consider all factors, namely, an amount of movement, an amount of rotation, a direction of gravity, whether the movement was against the direction of gravity, and what the final orientation of the electronic device (100) is after the movement occurs.

In one or more embodiments, movement of the electronic device (100) is buffered in the memory (111) of the electronic device (100) while the touch input is occurring. For instance, one or more motion sensors (103) can monitor motion of the electronic device (100) while the object is touching the touch-sensitive display (101). One or more processors (102) of the electronic device (100) can then store a data representation (139) of the motion of the electronic device (100) in a memory (111) of the electronic device (100). This data representation (139) can then be analyzed to determine whether the electronic device (100) moved in the three-dimensional space (104) while the touch input was occurring. However, the data representation (139) can also be used in other ways as well. For instance, the data representation (139) can be used to confirm whether the motion was due to a lifting or lowering gesture.

Illustrating by example, in one or more embodiments a moving average of acceleration values measured by the accelerometer (118), denoted $\alpha_{zero}$, is maintained in memory (111) by the one or more processors (102). In one or more embodiments, a moving average of 64 acceleration values can be maintained in the memory (111). At any one time, an instantaneous acceleration value can be measured by taking the square root of the sum of the instantaneous acceleration along the X-axis squared, the instantaneous acceleration along the Y-axis squared, and the instantaneous acceleration along the Z-axis squared in accordance with the following formula:

$$\alpha_{total} = SQRT(\alpha_{sub.x}^2 + \alpha_{sub.y}^2 + \alpha_{sub.z}^2) \quad \text{EQ. 1}$$

This value can be calculated at periodic intervals from the data representation (139) of the motion of the electronic device (100) stored in the memory (111), such as five or ten times a second, with each value being added to the moving average number of values on a first-in-first-out basis.

At any one time, meaningful acceleration can be determined by subtracting the moving average acceleration value from an instantaneous acceleration value in accordance with the following formula:

$$\alpha_{current} = \alpha_{total} - \alpha_{zero} \quad \text{EQ. 2}$$

Where this value, $\alpha_{currrent}$, is below a predetermined acceleration threshold, such as 0.5 meters per second squared, the one or more processors (102) can conclude that the electronic device (100) is not moving. The difference between the running average of acceleration and the acceleration due to gravity can then be calculated to determine the effect of gravity. In one embodiment, this includes subtracting the acceleration due to gravity, i.e., 9.8 meters per second squared, from the running average of acceleration values and adding this to a historical calculation of the same subtraction in accordance with the following equation:

$$\Delta_{gravity} = \Delta_{gravity} + (\alpha_{zero} - 9.8 \text{ m/sec}^2) \quad \text{EQ. 3}$$

This provides a directionality to the movement that enables the one or more processors (102) to determine whether movement of the electronic device (100) is with or against gravity.

The current velocity of the electronic device (100) can be calculated with the following equation:

$$v_{current} = v_{current} + (\alpha_{current} * t_{samplerate}^2) \quad \text{EQ. 4}$$

The total distance that the electronic device (100) moves during a motion or gesture can be calculated with the following equation:

$$d^{total} = (v^{samplerate} * t^{samplerate}) + 0.5 * (\alpha^{current} * t_{samplerate}^2) \quad \text{EQ. 5}$$

This distance can also be measured directly when the one or more motion sensors (103) include the barometer (120). The use of a barometer (120) alleviates the need to perform a double integration to determine distance using EQ. 5. With these factors, whether a gesture lifting the electronic device (100) has occurred can be confirmed.

Regardless of whether lifting gesture confirmation techniques are employed, or more simple techniques are used instead to determine whether the electronic device (100) moves in the three-dimensional space (104) while the object was touching the touch-sensitive display (101), such as only monitoring signals from the accelerometer (118), where such movement is detected the method 200 moves to step 203. At step 203, i.e., where the electronic device (100) moved in the three-dimensional space (104) while the object was touching the touch-sensitive display (101), the method 200 includes precluding, with the one or more processors (102) of the electronic device (100), execution of the control operation in response to the user input command received at step 201.

Accordingly, if a person attempting to grasp an electronic device (100) that is placed on a table top, while the electronic device (100) is in an unlocked mode of operation, and inadvertently touches the touch-sensitive display (101) while either grasping the sides of the electronic device (100) or lifting the electronic device (100), this touch input will be ignored due to the fact that the one or more motion sensors (103) of the electronic device (100) determined that the electronic device (100) moved in the three-dimensional space (104) while the touch input was occurring. If the person were watching a movie while the electronic device (100) was placed on the tabletop, they would be assured that the movie would continue playing without interruption while grasping and lifting the electronic device (100) thanks to the benefits and advantages of embodiments of the present disclosure.

By contrast, where the electronic device (100) moves in two or fewer dimensions, as determined at decision 202, embodiments of the disclosure conclude that such movement is not due to a lifting or grasping gesture, and is instead due to intentional user input commands being delivered to the touch-sensitive display (101) of the electronic device (100). Accordingly, the method 200 moves to step 204 where the control operation identified by the user input command resulting from the touch input is executed. Thus, in one or more embodiments step 204 comprises, where the electronic device (100) failed to move in the three-dimensional space (104) while the object was touching the touch-sensitive display (101), executing, with the one or more processors (102) of the electronic device (100), the control operation in response to the user input command identified by the touch input received at step 201.

In one or more embodiments, step 204 further comprises detecting, with the touch-sensitive display (101), the object delivering the touch input at step 201 thereafter releasing the touch-sensitive display (101). For example, where the touch input received at step 201 occurred at a standard mode user actuation target, in many embodiments, the control operation is performed after the object delivering the touch input stops delivering the same by releasing from the touch-sensitive display (101).

In other embodiments, step 204 will occur while the object is still in contact with the touch-sensitive display (101). For example, where the touch input received at step 201 occurred at an extended touch mode user actuation target, the touch input would be required to occur for at least a predefined amount of time, e.g., two seconds. Thus, the execution of the control operation in response to the user input command of step 204 may occur at the expiration of this predefined amount of time, but prior to the object releasing the touch-sensitive display (101) in some embodiments.

Embodiments of the disclosure contemplate that when delivering such user input commands to the electronic device (100), when the electronic device (100) is not within the hand but is rather resting on a surface, may move the electronic device (100) in one, or two, dimensions along the surface when moving the electronic device (100) parallel to the surface. Moreover, if the surface is tilted, these one or two dimensions can change the elevation of the electronic device (100) and/or the potential energy of the electronic device (100) due to the effect of gravity. Accordingly, in one or more embodiments decision 202 determines whether the electronic device (100) moves in more than two dimensions in free space during touch input received at step 201. Where it does, preclusion of the control operation requested by the user command received in the form of the touch input occurs at step 203. By contrast, where the motion occurs in less than two dimensions, execution of the control operation requested by the user command received in the form of the touch input occurs at step 204.

Where the control operation is precluded at step 203, embodiments of the disclosure contemplate that a user will thereafter interact with the touch-sensitive display (101) to deliver touch input identifying user input commands. Accordingly, after step 203 the method 200 moves to step 205.

In one or more embodiments, step 205 comprises, after the precluding the execution of the control operation in response to the user input command occurred at step 204, receiving, with the touch-sensitive display (101), another touch input defining another user input command to perform another control operation. Thereafter, in one or more embodiments step 205 further comprises executing, with the one or more processors (102), the other control operation in response to the subsequent user input command. Thus, after the preclusion step of 203, the electronic device (100) returns to its normal mode of operation at step 205.

In one or more embodiments, the method 200 of FIG. 2 effectively separates the presentation function of the touch-sensitive display (101) and its touch-sensing function. If the electronic device (100) is in the unlocked mode of operation with the touch-sensitive display (101) being active, one or more user actuation targets, content, applications, combinations thereof, or other information will be present on the display. However, during grasping and lifting (or alternatively grasping and lowering) operations, the touch-sensing function is momentarily disabled so that inadvertent—or intentional—touching of the touch-sensitive display (101) will not cause any control operation to be performed. Accordingly, a person can view the touch-sensitive display (101), but the one or more processors (102) will not perform any control operations when the touch-sensitive display is touched during the grasp and/or lift operation.

Now that the general method has been described, attention will be turned to additional methods offering additional features and advantages of embodiments of the disclosure. Recall from above that user actuation targets can come in two forms: A first type of user actuation target is a standard mode user actuation target. With standard mode user actuation targets, simply delivering touch input to the location of the standard mode user actuation target on the surface (105) of the touch-sensitive display (101) delivers a user input command requesting performance of a control operation.

By contrast, a second type of user actuation target is an extended touch mode user actuation target. With an extended touch mode user actuation target, delivering touch input at the location of the extended mode user actuation target for at least a predefined amount of time, e.g., two seconds, results in that user input command requesting a secondary control operation to occur. For example, a "long press" at an extended touch mode user actuation target may allow a user to select text in a message, webpage, or document, activate drop down menus as shown above with reference to FIG. 1, or perform other operations.

In one or more embodiments, a first decision is to determine whether touch input is being received at a standard mode user actuation target or an extended touch mode user actuation target. In one or more embodiments, if the touch input occurs at a standard mode user actuation target, the one or more processors (102) perform the control operation in response to the user input command corresponding to the touch input when the touch input ceases, i.e., where the object delivering the touch in put releases the touch-sensitive display (101). However, if the touch input occurs at an extended mode user actuation target, in one or more embodiments the one or more processors (102) execute the control operation corresponding to the touch input in response to cessation of the touch input (performing the first function of the extended mode user actuation target), or expiration of a timer (performing the second function of the extended mode user actuation target), whichever happens first. FIG. 3 below illustrated one explanatory method that can be employed with touch input received at standard mode user actuation targets, while FIG. 4 illustrates one explanatory method that can be employed with touch input received at extended touch mode user actuation targets.

Turning now to FIG. 3, illustrated therein is another method 300 for using an electronic device configured in accordance with one or more embodiments of the disclosure. In one or more embodiments, the method 300 precludes the execution of control operations in response to user input commands delivered by objects touching a touch-sensitive display of the electronic device during device grasping and/or lifting or lowering operations in accordance with one or more embodiments of the disclosure.

Beginning at step 301, the method 300 optionally determines, with the one or more motion sensors, whether the electronic device is stationary. In one or more embodiments, this step 301 comprises detecting, with the one or more motion sensors of the electronic device, a lack of motion of the electronic device for at least a predefined amount of time. In one or more embodiments, the predefined amount of time is at least ten seconds. In another embodiment, the predefined amount of time is at least thirty seconds. In still another embodiment, the predefined amount of time is at least one minute. Other predefined amounts of time will be obvious to those of ordinary skill in the art having the benefit of this disclosure.

In one or more embodiments, step 301 further comprises determining whether the electronic device is in an unlocked mode of operation. In one or more embodiments, step 301 further comprises determining whether a touch-sensitive display of the electronic device is in an active mode of operation, e.g., is presenting at least one user actuation target with which touch input can interact to cause a control operation to be executed or performed. Accordingly, in one or more embodiments step 301 comprises detecting, with one or more motion sensors of the electronic device, a lack of motion of the electronic device for at least a predefined amount of time while the electronic device is in an unlocked mode of operation. Since step 301 can comprise determining whether the touch-sensitive display of the electronic device is in an active mode of operation, in one or more embodiments step 301 can comprise one or more processors causing a presentation of at least one user actuation target on the touch-sensitive display.

In one or more embodiments, step 302 then comprises receiving, with a touch-sensitive display of the electronic device, touch input identifying a user command to perform a control operation. In one or more embodiments, step 302 comprises receiving this touch input at a standard mode user actuation target, where the user command would be a request to execute a control operation identified by the user actuation target. If, for example, the user actuation target corresponded to an application, as was the case above with reference to FIG. 1, the user command may request a control operation to be executed that causes the application to launch. By contrast, if the user actuation target were a virtual fast forward button in a video or music player, the user command may request a control operation to be executed that causes the video or music to be presented in a fast-forward mode, and so forth. Since step 301 can comprise one or more processors causing a presentation of at least one user actuation target on the touch-sensitive display prior to the touch input occurring at step 302, in one or more embodiments step 302 can comprise the touch-sensitive display identifying whether the touch input occurs at a location corresponding to the at least one user actuation target.

At optional step 303, motion of the electronic device in three-dimensional space can be monitored and buffered. Illustrating by example, in one or more embodiments step 303 comprises monitoring, with one or more motion sensors, motion of the electronic device while the object is touching the touch-sensitive display and storing, with one or more processors, a data representation of the motion of the electronic device in a memory of the electronic device. Where this step 303 is included, decision 305 below can use the data representation of the motion of the electronic device to determine whether movement of the electronic device in more than two dimensions occurred. Moreover, the inclusion of optional step 303 allows for methods in accordance with embodiments of the disclosure to perform confirmation operations such as those described above with reference to FIG. 2 to confirm that movement in three-dimensional space is in response to a lifting or lowering gesture rather than another action as previously described.

Decision 304 then determines whether the object touching the touch-sensitive display of the electronic device at step 302 remains in contact with the touch-sensitive display. Said differently, in one or more embodiments decision 304 comprises the touch-sensitive display identifying a cessation of the touch input. As noted above, with some user actuation targets touch input and a corresponding release may be required in combination for the one or more processors of the electronic device to conclude that a user input command to perform a control operation occurred.

In one or more embodiments, decision 304 determines detecting, with the touch-sensitive display, the object releasing the touch-sensitive display. Where the object delivering the touch input at step 302 has not released the touch-sensitive display, in one or more embodiments the method 300 returns to step 303. However, where the object delivering the touch input at step 302 has released the touch-sensitive display, the method moves to decision 305.

In one or more embodiments, decision 305 comprises determining, with the one or more motion sensors, whether the electronic device moves in more than two dimensions in free space during the touch input being received at step 302. As noted above, where step 303 is included the determination made at decision 305 can include identifying, with the one or more processors, whether the data representation of the motion of the object stored in the memory of the electronic device indicates a three-dimensional motion of the electronic device beyond a predefined threshold.

At step 306, where the electronic device moves in more than the two dimensions in free space, i.e., in three-dimensional space, the method 300 precludes performance of the control operation in response to the user command received at step 302. Where optional step 301 is included, the preclusion activity occurring at step 306 occurs only when the electronic device was both in the unlocked mode of operation and stationary when the touch input was initially received at step 302.

By contrast, step 307 comprises executing, with the one or more processors of the electronic device, the control operation in response to the user input command. In one or more embodiments, step 307 comprises executing of the control operation in response to the cessation of the touch input where the electronic device failed to move in the three-dimensional space while the touch input was occurring. In this illustrative embodiment the execution of step 307 occurs where decision 304 detects, with the touch-sensitive display, the object releasing the touch-sensitive display and, thereafter, decision 305 determines the electronic device failed to move in the three-dimensional space while the object was touching the touch-sensitive display at step 302. Thus, in one or more embodiments step 307 comprises performing the control operation in response to the user command where the electronic device moved in two or fewer dimensions in free space during the touch.

At step 308, the electronic device returns to its normal mode of operation where the touch-sensitive display responds to any touch input. In one or more embodiments, step 308 comprises, after the preclusion of the execution of the control operation in response to the user input command at step 306, receiving, with the touch-sensitive display, another touch input defining another user input command to perform another control operation. Thereafter, in one or more embodiments step 308 comprises executing, with the one or more processors, the other control operation in response to other the user input command.

Turning now to FIG. 4, illustrated therein is another method 400 for using an electronic device configured in accordance with one or more embodiments of the disclosure. In one or more embodiments, the method 400 precludes the execution of control operations in response to user input commands delivered by objects touching a touch-sensitive display of the electronic device during device grasping and/or lifting or lowering operations in accordance with one or more embodiments of the disclosure.

Beginning at step 401, the method optionally determines, with the one or more motion sensors, whether the electronic device is stationary. In one or more embodiments, this step 401 comprises detecting, with the one or more motion sensors of the electronic device, a lack of motion of the electronic device for at least a predefined amount of time. Examples of the predefined amount of time used to confirm whether the electronic device is stationary include durations of five seconds, ten seconds, twenty seconds, forty seconds, or one minute. Other predefined amounts of time will be obvious to those of ordinary skill in the art having the benefit of this disclosure.

In one or more embodiments, step 401 further comprises determining whether the electronic device is in an unlocked mode of operation. In one or more embodiments, step 401 further comprises determining whether a touch-sensitive display of the electronic device is in an active mode of operation, e.g., is presenting content, at least one user actuation target with which touch input can interact to cause a control operation to be executed or performed, or combinations thereof. Unlocked modes of operation differ from locked modes of operation in that in the latter case, passcodes, pin codes, biometric identifiers or other information must be entered before performing other control operations.

By contrast, when the electronic device is in the unlocked mode of operation, touch input along the touch-sensitive display causes control operations to occur absent the preclusion operations described herein with reference to FIGS. 2-4. Accordingly, in one or more embodiments step 401 comprises detecting, with one or more motion sensors of the electronic device, a lack of motion of the electronic device for at least a predefined amount of time while the electronic device is in an unlocked mode of operation with the touch-sensitive display actively displaying information, content, and/or user actuation targets. Since step 401 can comprise determining whether the touch-sensitive display of the electronic device is in an active mode of operation, in one or more embodiments step 401 can comprise one or more processors causing a presentation of at least one user actuation target on the touch-sensitive display.

In one or more embodiments, step 402 then comprises detecting, with a touch-sensitive display of the electronic device, touch input occurring at a surface of the touch-sensitive display. In one or more embodiments, step 402 comprises detecting touch input identifying a user command to perform a control operation. Since step 401 can comprise one or more processors causing a presentation of at least one user actuation target on the touch-sensitive display prior to the touch input occurring at step 402, in one or more embodiments step 402 comprises the touch-sensitive display identifying whether the touch input occurs at a location corresponding to the at least one user actuation target.

In one or more embodiments, step 402 comprises receiving this touch input at an extended touch mode user actuation target, where the user command could be a request to execute a control operation identified by the user actuation target. Alternatively, if the touch input occurs for at least a predefined time threshold, such as two, three, or five seconds, the user command could be a request to execute a secondary control operation identified by the combination of the user actuation target and the amount of time in which the touch input occurred.

If, for example, the user actuation target corresponded to an operational function, such as starting or pausing a video, touching the extended touch mode user actuation target and releasing it prior to the predefined time threshold may request a control operation to be executed that causes the video to start, or pause, as the case may be. By contrast, if the touch input occurs at the extended touch mode user actuation target for a duration that exceeds the predefined time threshold, this action may request a secondary function to occur. One example of such a secondary function was actuating a volume control, as described above with reference to FIG. 1. However, numerous other secondary functions will be obvious to those of ordinary skill in the art having the benefit of this disclosure.

Since FIG. 4 is directed to touch input occurring at an extended touch mode user actuation target, after touch is detected at such a user actuation target at step 402, step 403 initiates a timer for the predefined time threshold at which the primary function requested by touching the extended touch mode user actuation target becomes a secondary function. Thus, in one or more embodiments where step 402 comprises identifying, with the touch-sensitive display, whether the touch input occurs at a location corresponding to an extended touch mode user actuation target, step 403 comprises initiating a timer. Since step 401 can comprise one or more processors causing a presentation of at least one user actuation target on the touch-sensitive display prior to the touch input occurring at step 402, in one or more embodiments step 403 can comprise the touch-sensitive display identifying whether the touch input occurs at a location corresponding to the at least one user actuation target, and the one or more processors initiating a timer where the touch input occurs at the location corresponding to the at least one user actuation target.

At optional step 404, motion of the electronic device in three-dimensional space can be monitored and buffered. Illustrating by example, in one or more embodiments step 404 comprises monitoring, with one or more motion sensors, motion of the electronic device while the object is touching the touch-sensitive display and storing, with one or more processors, a data representation of the motion of the electronic device in a memory of the electronic device. Where this step 403 is included, decisions 406,412 below can use the data representation of the motion of the electronic device to determine whether movement of the electronic device in more than two dimensions occurred in one or more embodiments.

Decision 405 then determines whether the timer initiated at step 403 has expired. Where it has, the method 400 moves to decision 406. Decision 406 comprises determining, with the one or more motion sensors, whether the electronic device moves in three-dimensional space while the touch input is and/or was being received at step 402. In one or more embodiments, decision 406 comprises determining whether the electronic device moved in the three-dimensional space while the object was touching the touch-sensitive display either upon, or after, expiration of the timer, as determined at decision 405. Where step 404 is included, the determination made at decision 406 can include identifying, with the one or more processors, whether the data representation of the motion of the object stored in the memory of the electronic device indicates a three-dimensional motion of the electronic device beyond a predefined threshold.

After the expiration of the timer, as determined at decision 405, and where no three-dimensional motion of the electronic device occurred during the touch input received at step 402, as determined at decision 406, the method 400 moves to step 407. At step 407, the method 400 executes, with the one or more processors of the electronic device, the control operation in response to the user input command identified from the touch input received at step 402. Thus, in one or more embodiments step 407 includes performing the control operation in response to the user command identified from the touch input received at step 402, but only where both the electronic device moved in two or fewer dimensions in free space during the touch input timer expired.

Returning to decision 406, where the electronic device moved in three-dimensional space while the touch input was being received at step 402, but after the expiration of the timer, as determined by decision 405, the method moves to decision 409. Decision 409 determines whether the object touching the touch-sensitive display of the electronic device at step 302 remains in contact with the touch-sensitive display. Said differently, in one or more embodiments decision 409 comprises the touch-sensitive display identifying a cessation of the touch input. Where it has, the method 400 moves to step 410. However, where is has not, the method 400 waits by returning to decision 409.

Since the timer has expired along this branch of the method 400, ordinarily the secondary function of the extended touch mode user actuation target touched at step 402 would be called. However, at step 410, in addition to the expiration of the timer, decision 406 has determined that three-dimensional motion of the electronic device occurred while the touch input was being received. In one or more embodiments, step 410 comprises precluding the execution of the control operation in response to the user input command only after both the expiration of the timer and release of the touch-sensitive display by the object. In one or more embodiments, where decision 409 comprises the touch-sensitive display identifying a cessation of the touch input after an expiration of the timer determined by decision 405, step 410 comprises one or more processors precluding the execution of the control operation in response to the touch input received at step 402 where the electronic device moved in the three-dimensional space while the touch input was occurring in response to both the cessation of the touch input and the expiration of the timer.

Accordingly, rather than responding to the touch input by performing a control operation related to the secondary function of the extended touch mode user actuation target, step 410 comprises precluding performance of the control operation in response to the user command received at step 402. Where optional step 401 is included, the preclusion activity occurring at step 410 occurs only when the electronic device was both in the unlocked mode of operation and stationary when the touch input was initially received at step 402.

The method 400 then moves to step 414. At step 414, the electronic device returns to its normal mode of operation where the touch-sensitive display responds to any touch input. In one or more embodiments, step 414 comprises, after the preclusion of the execution of the control operation in response to the user input command at step 410, receiving, with the touch-sensitive display, another touch input defining another user input command to perform another control operation. Thereafter, in one or more embodiments step 414 comprises executing, with the one or more processors, the other control operation in response to other the user input command. In one or more embodiments, step 414 comprises, after the one or more processors preclude the execution of the control operation at step 410, detecting another touch input identifying another user input command requesting performance of another control operation, and executing, with one or more processors of the electronic device, the other control operation in response to the other touch input.

Returning now to decision 405, the series of events that can occur prior to expiration of the timer initiated at step 403 will be explored. In one or more embodiments, decision 408 comprises detecting, with the touch-sensitive display, the object releasing the touch-sensitive display. Where the object delivering the touch input at step 402 has not released the touch-sensitive display, as determined by decision 408, and the timer initiated at step 403 has not expired, as determined by decision 405, the method 400 returns to step 404, where the motion of the electronic device continues to be buffered as previously described.

By contrast, where the object delivering the touch input at step 402 has released the touch-sensitive display, as determined by decision 408, and the timer initiated at step 403 has not expired, as determined by decision 405, the method 400 moves to decision 412. Decision 412 comprises determining, with the one or more motion sensors, whether the electronic device moves in three-dimensional space while the touch input is and/or was being received at step 402. Where step 404 is included, the determination made at decision 412 can include identifying, with the one or more processors, whether the data representation of the motion of the object stored in the memory of the electronic device indicates a three-dimensional motion of the electronic device beyond a predefined threshold.

Since the timer has not expired along this branch of the method 400, ordinarily the primary function of the extended touch mode user actuation target touched at step 402 would be called by a control operation occurring in response to the user input command. However, decision 412 has determined that three-dimensional motion of the electronic device occurred while the touch input was being received. Accordingly, rather than responding to the touch input by performing a control operation related to the primary function of the extended touch mode user actuation target, step 415 comprises precluding performance of the control operation in response to the user command received at step 402. In one or more embodiments where decision 408 comprises the touch-sensitive display identifying a cessation of the touch input prior to expiration of the timer, step 415 comprises one or more processors precluding the execution of the control operation in response to the touch input received at step 402 where the electronic device moved in the three-dimensional space while the touch input was occurring in response to the cessation of the touch input. Where optional step 401 is included, the preclusion activity occurring at step 415 occurs only when the electronic device was both in the unlocked mode of operation and stationary when the touch input was initially received at step 402. The method 400 then moves to step 414 as previously described.

By contrast, at step 413, i.e., where the timer initiated at step 403 has not expired, but where the object delivering the touch input at step 402 has released the touch-sensitive display, and also where the electronic device has not experienced a three-dimensional motion during that same touch input, step 413 executes, with the one or more processors of the electronic device, the control operation in response to the user input command identified from the touch input received at step 402. In one or more embodiments, step 413 comprises executing of the control operation in response to the cessation of the touch input where the electronic device failed to move in the three-dimensional space while the touch input was occurring. Thus, in one or more embodiments step 413 includes performing the control operation in response to the user command identified from the touch input received at step 402, but only where (1) the electronic device moved in two or fewer dimensions in free space during the touch input, (2) the object delivering the touch input has released the touch-sensitive display, and (3) the timer has not expired. The method 400 then moves to step 414 as previously described.

Figure 5:
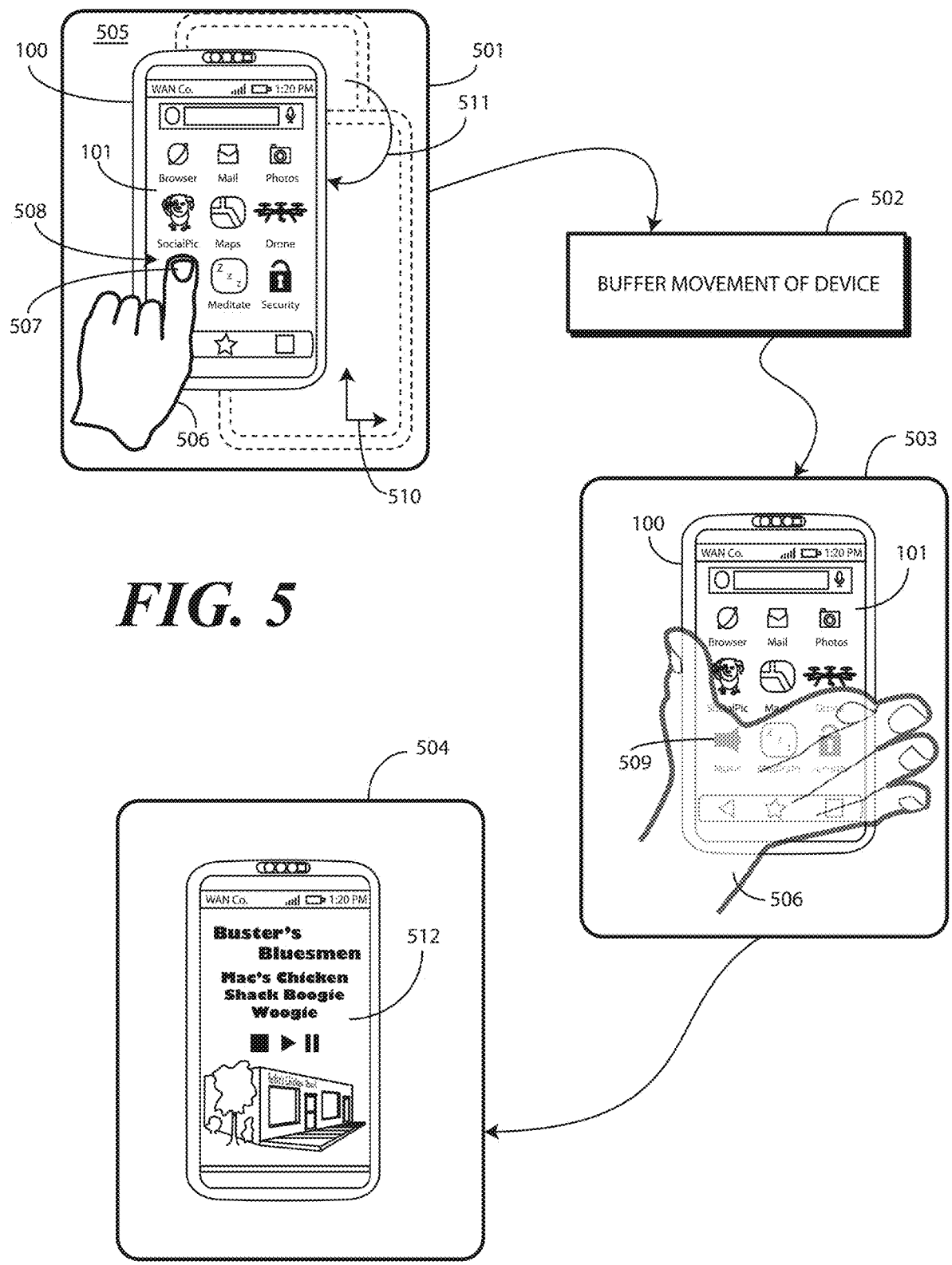
FIG. 5 illustrates still another explanatory method in accordance with one or more embodiments of the disclosure.
Figure 6:
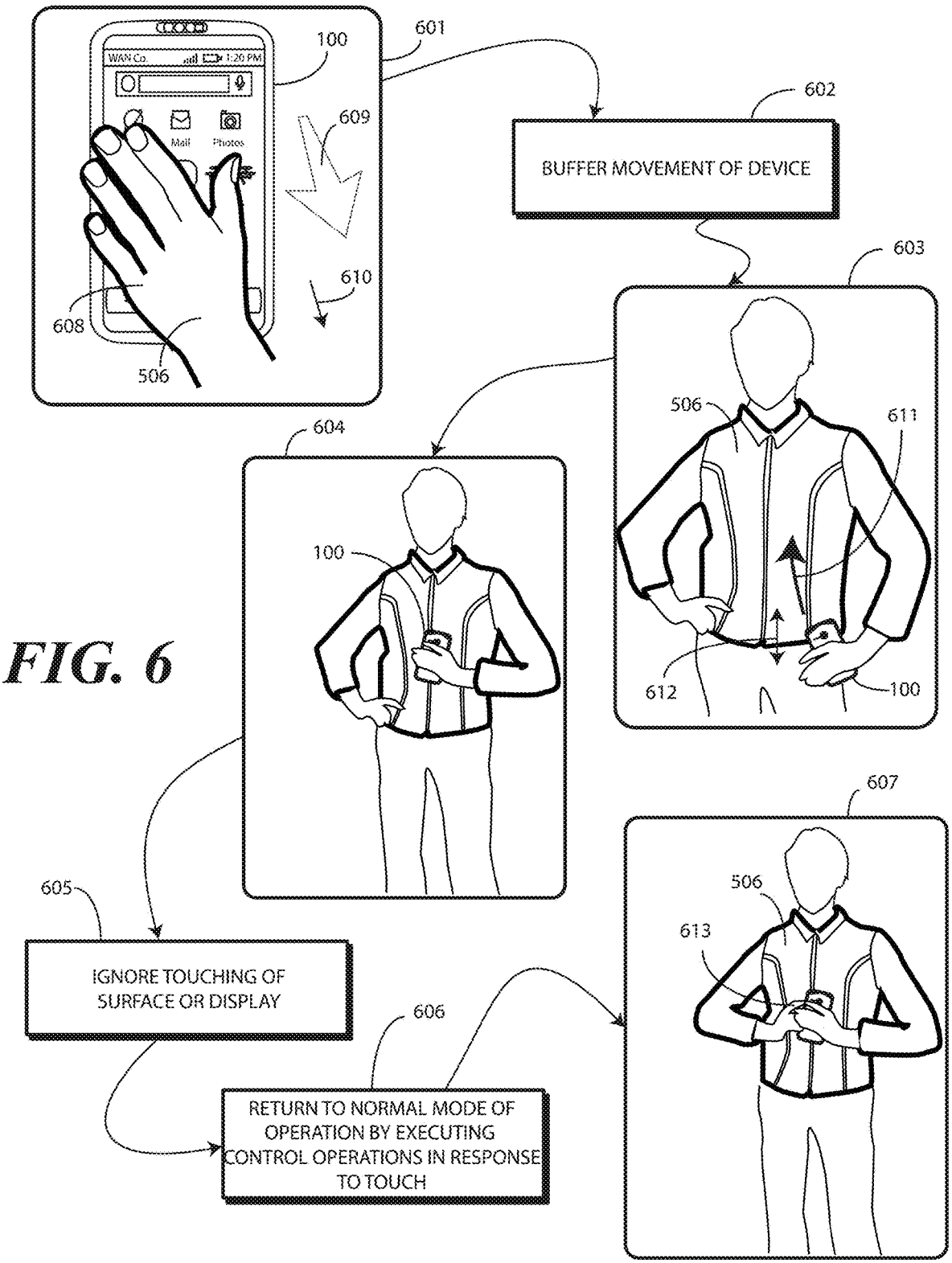
FIG. 6 illustrates another explanatory method in accordance with one or more embodiments of the disclosure.
Figure 8:
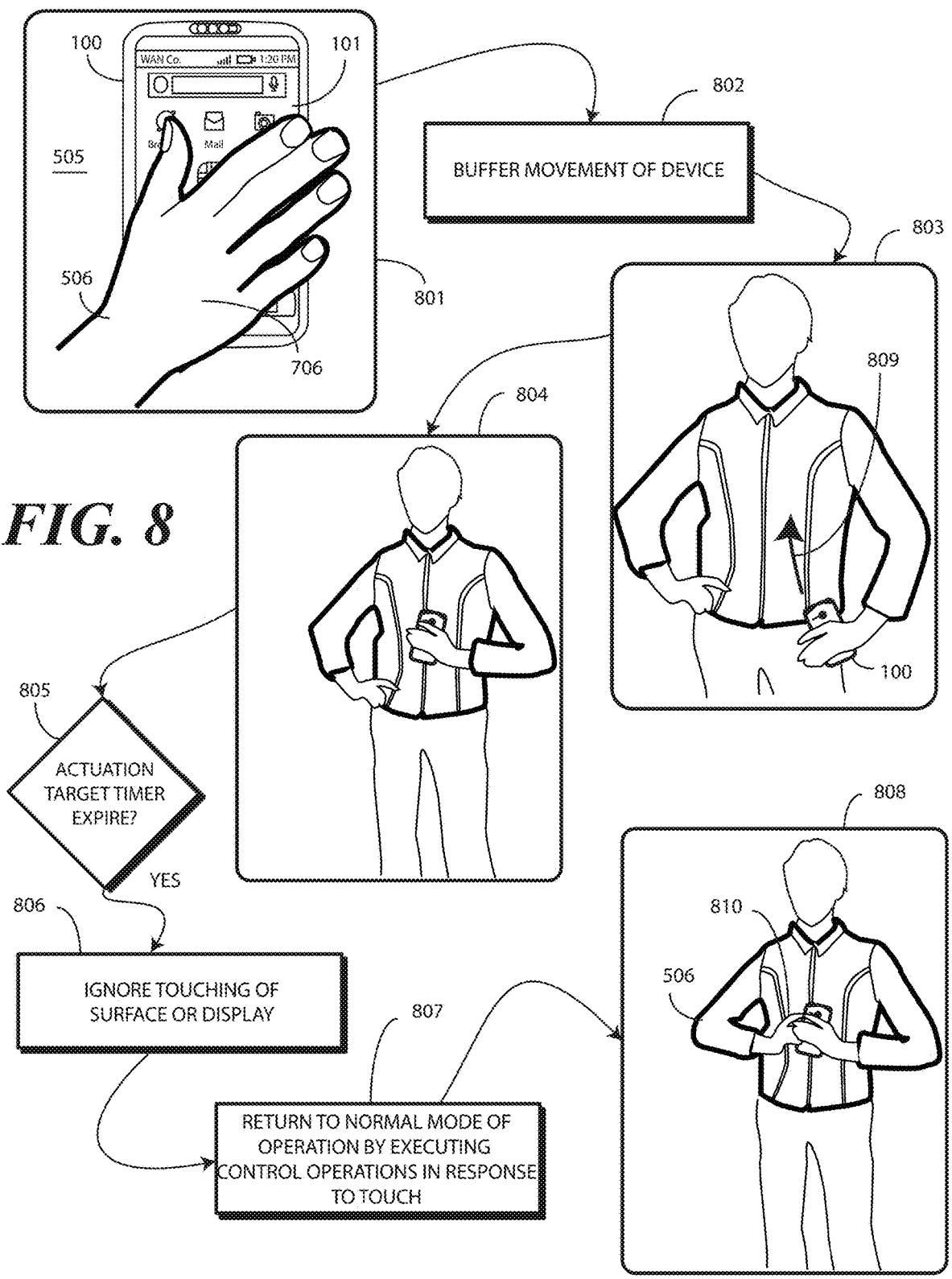
FIG. 8 illustrates yet another explanatory method in accordance with one or more embodiments of the disclosure.

Turning now to FIGS. 5-8, practical examples of the methods (300,400) of FIGS. 3-4 will be illustrated. FIGS. 5-6 illustrate the method (300) of FIG. 3, while FIGS. 7-8 illustrate the method (400) of FIG. 4.

Beginning with FIG. 5, at step 501 an electronic device 100 configured in accordance with one or more embodiments of the disclosure is placed on a flat surface 505. In the illustrative embodiment of FIG. 5, the flat surface is a desktop. As shown, the electronic device 100 is in the unlocked mode of operation with one or more processors (102) of the electronic device causing the presentation of one or more user actuation targets on the touch-sensitive display 101, which is active.

At step 501, a person 506 is delivering touch input 507 at one of the user actuation targets (not shown at step 501, but shown as user actuation target 509 in step 503). In this illustrative embodiment, the user actuation target 509 is a standard mode user actuation target that has a singular function. In this example, the function is launching an application corresponding to the user actuation target 509. Accordingly, by delivering the touch input 507 to a location above the user actuation target 509, the person 506 is delivering a user input command 508 to perform a control operation, which in this example is launching a music player application.

As shown at step 501, while delivering the touch input 507, the person 506 happens to slide the electronic device 100 in a clockwise motion along the surface 505 of the desktop. Accordingly, the electronic device 100 moves in two dimensions 510 while the touch input 507 is being delivered. This motion is buffered at step 502. In one or more embodiments, step 502 comprises monitoring, with the one or more motion sensors (103), motion 511 of the electronic device 100 while the object (here, the person's finger) is touching the touch-sensitive display 101 and storing, with the one or more processors (102), a data representation (139) of the motion 511 of the electronic device 100 in a memory (111) of the electronic device 100.

At step 503, the person 506 releases the touch-sensitive display 101 by lifting their hand. In one or more embodiments, the touch-sensitive display 101 detects the object (here, the person's finger) releasing the touch-sensitive display.

At step 503, one or more processors (102) of the electronic device 100 determine, from one or more motion sensors (103) of the electronic device 100, whether the electronic device 100 moved in three-dimensional space (104) while the object is or was touching the touch-sensitive display 101. In this example, as shown at step 501, the electronic device 100 moved in only two dimensions across the surface 505 of the desktop. In this example, at step 503 a situation arises where the electronic device 100 failed to move in three-dimensional space (104) while the object was touching the touch-sensitive display 101. Accordingly, the one or more processors (102) execute the control operation in response to the user input command 508 received at step 501. As shown at step 504, the one or more processors (102) launch the music player application 512.

Turning now to FIG. 6, at step 601 the electronic device 100 is still resting on the flat surface 505 of the desktop. As with step (501) of FIG. 5, the electronic device 100 is in the unlocked mode of operation with one or more processors (102) of the electronic device causing the presentation of one or more user actuation targets on the touch-sensitive display 101, which is active.

At step 601, a person 506 is again delivering touch input 608 at one of the user actuation targets. However, in this example the touch input 608 is inadvertent, as the person 506 is grasping the electronic device 100 and sliding 609 it across the surface 505 of the desktop in a single dimension 610. As shown, the person's finger is delivering the touch input to user actuation target (509). Ordinarily, this would cause the one or more processors (102) of the electronic device 100 to launch the music player application (512), as described above with reference to FIG. 5. However, the electronic device 100 is configured in accordance with embodiments of the disclosure.

As such, motion of the electronic device 100 while the touch input 608 is occurring is buffered at step 602. In one or more embodiments, step 602 comprises monitoring, with the one or more motion sensors (103), motion of the electronic device 100 while the object is touching the touch-sensitive display 101 and storing, with the one or more processors (102), a data representation (139) of the motion of the electronic device 100 in a memory (111) of the electronic device 100. This buffering continues, in one or more embodiments, as long as the touch input continues.

As shown at step 603, the person 506 has picked the electronic device 100 up from the surface 505 of the desktop and is lifting the electronic device 100 with a lifting motion 611 so as to be able to see the touch-sensitive display 101. The lifting motion concludes at step 604, with the lifting motion 611 being buffered along with the sliding 609 motion. At step 604, the one or more processors (102) of the electronic device 100 determine, in conjunction with the one or more motion sensors (103), whether the electronic device 100 has moved in three-dimensional space while the touch input 608 is occurring. In this illustrative embodiment, the one or more processors (102) do this by identifying whether the data representation (139) of the motion of the object stored in the memory (111) of the electronic device 100 indicates a three-dimensional motion of the electronic device 100 beyond a predefined threshold 612. Here, such a motion has clearly occurred.

Accordingly, at step 605 the one or more processors (102) preclude execution of the control operation in response to the touch input 608 due to the fact that the electronic device 100 moved in the three-dimensional space while the touch input was occurring. Thus, rather than launching the music player application (512) as in step (504) of FIG. 5, the touch input occurring at user actuation target (509), as well as touch input occurring at other user actuation targets, is simply ignored at step 605.

Thereafter, the electronic device 100 returns to a normal mode of operation at step 606. Accordingly, after precluding the execution of the control operation at step 605 in response to the user input command identified from the touch input 608 received at step 601, step 606 allows receipt, with the touch-sensitive display 101, other touch input. Thus, as shown at step 607, the person 506 can deliver another touch input 613 defining another user input command to perform another control operation. At step 607, the one or more processors (102) of the electronic device 100 can then execute, normally, the other control operation in response to other the user input command.

Turning now to FIG. 7, at step 701 an electronic device 100 configured in accordance with one or more embodiments of the disclosure is again placed on a flat surface 505. As shown, the electronic device 100 is in the unlocked mode of operation with one or more processors (102) of the electronic device causing the presentation of one or more user actuation targets on the touch-sensitive display 101, which is active.

At step 701, a person 506 is delivering touch input 706 at one of the user actuation targets (not shown at step 701, but shown as the star-shaped user actuation target in FIG. 1). In this illustrative embodiment, the user actuation target is an extended touch mode user actuation target that has a primary function and a secondary function. In this example, the primary function is showing a list of active applications when the extended touch mode user actuation target is touched and released prior to the expiration of the predefined time threshold. In this example, the secondary function is launching a camera application when the extended touch mode user actuation target is touched and held longer than the predefined time threshold.

Since the person 506 is delivering touch input 706 identifying a user input command 707 at an extended touch mode user actuation target at step 701, step 702 performs two functions. First, step 702 buffers motion of the electronic device 100 by monitoring, with the one or more motion sensors (103), motion of the electronic device 100 while the object (here, the person's finger) is touching the touch-sensitive display 101 and storing, with the one or more processors (102), a data representation (139) of the motion of the electronic device 100 in a memory (111) of the electronic device 100. Second, step 702 initiates a timer to determine whether the primary function of the extended touch mode user actuation target or the secondary function of the extended touch mode user actuation target should be performed in response to the touch input 706.

As previously described above with reference to FIG. 4, decision 703 then determines whether the timer has expired. In this illustrative example, the timer expires prior to the method moving to step 704. As shown at step 704, the person 506 is still delivering touch input 706 to the extended touch mode user actuation target.

As with previous embodiments, at step 704 one or more processors (102) of the electronic device 100 determine, from one or more motion sensors (103) of the electronic device 100, whether the electronic device 100 moved in three-dimensional space (104) while the object is or was touching the touch-sensitive display 101. In this example, as shown at step 701, the electronic device 100 remained stationary on the surface 505 of the desktop. Accordingly, at step 704 the electronic device 100 has failed to move in three-dimensional space (104) while the object was touching the touch-sensitive display 101.

In this situation, at step 705 the one or more processors (102) execute the control operation in response to the user input command 707 received at step 701. Since the timer has expired, as determined at decision 703, the one or more processors (102) of the electronic device 100 execute the secondary function associated with the extended touch mode user actuation target. Thus, as shown at step 705, the one or more processors (102) launch the camera application 708.

Turning now to FIG. 8, at step 801 the electronic device 100 is still resting on the flat surface 505 of the desktop. As with step (701) of FIG. 7, the electronic device 100 is in the unlocked mode of operation with one or more processors (102) of the electronic device causing the presentation of one or more user actuation targets on the touch-sensitive display 101, which is active.

At step 801, a person 506 is again delivering touch input 706 at one of the user actuation targets. However, as was the case with FIG. 6 above, in this example the touch input 706 is inadvertent, as the person 506 is grasping the electronic device 100 while it sits one the surface 505 of the desktop. As shown, the person's finger is delivering the touch input to the extended touch mode user actuation target. Ordinarily, this would cause the one or more processors (102) of the electronic device 100 to perform the primary function, or the secondary function, associated with the extended touch mode user actuation target depending upon how long the touch input 706 occurred at the extended touch mode user actuation target. However, the electronic device 100 is configured in accordance with embodiments of the disclosure and functions to prevent inadvertent touching from causing control operations to occur.

As such, motion of the electronic device 100 while the touch input 706 is occurring is buffered at step 802. Additionally, a timer is initiated at step 802. In one or more embodiments, step 802 comprises monitoring, with the one or more motion sensors (103), motion of the electronic device 100 while the object is touching the touch-sensitive display 101 and storing, with the one or more processors (102), a data representation (139) of the motion of the electronic device 100 in a memory (111) of the electronic device 100. This buffering continues, in one or more embodiments, as long as the touch input continues.

As shown at step 803, the person 506 has picked the electronic device 100 up from the surface 505 of the desktop and is lifting the electronic device 100 with a lifting motion 809. The lifting motion concludes at step 804, with the lifting motion 809 being buffered at step 802.

At step 804, the one or more processors (102) of the electronic device 100 determine, in conjunction with the one or more motion sensors (103), whether the electronic device 100 has moved in three-dimensional space while the touch input 706 is occurring. In this illustrative embodiment, the one or more processors (102) do this by identifying whether the data representation (139) of the motion of the object stored in the memory (111) of the electronic device 100 indicates a three-dimensional motion of the electronic device 100 beyond a predefined threshold. Here, such a motion has clearly occurred.

At decision 805, the one or more processors (102) determine whether the timer initiated at step 802 has expired prior to the object (here, the person's hand) releases the extended touch mode user actuation target. Here it has. Therefore, at step 806 the one or more processors (102) preclude execution of the control operation in response to the touch input 706 due to the fact that the electronic device 100 moved in the three-dimensional space while the touch input was occurring at the extended touch mode user actuation target. Thus, rather than launching the camera application (708) as in step (705) of FIG. 7, the touch input occurring at the extended touch mode user actuation target, as well as touch input occurring at other user actuation targets, is simply ignored at step 806.

Thereafter, the electronic device 100 returns to a normal mode of operation at step 807. Accordingly, after precluding the execution of the control operation at step 806 in response to the user input command identified from the touch input 706 received at step 801, step 807 allows receipt, with the touch-sensitive display 101, other touch input. Thus, as shown at step 808, the person 506 can deliver another touch input 810 defining another user input command to perform another control operation. At step 808, the one or more processors (102) of the electronic device 100 can then execute, normally, the other control operation in response to other the user input command.

As shown and described, embodiments of the disclosure provide methods and systems to prevent inadvertent touching of the touch-sensitive display (or other surface) of an electronic device from causing control operations to occur when the electronic device is being moved in three dimensions, as is the case when the electronic device is being picked up or lifted from a surface. In one or more embodiments, when the electronic device is detected as being located on a stationary surface, in an unlocked mode of operation and with the touch-sensitive display actively presenting content, user actuation targets, information, or combinations thereof, the control operation prevention feature is enabled. This feature prevents inadvertent touching of the touch-sensitive display (or other surface) of an electronic device from causing control operations to occur when the electronic device is being moved in three dimensions.

When in this mode of operation, one or more motion sensors of the electronic device monitor and buffer motion of the electronic device while the touch input is being received. In one or more embodiments, if the electronic device experiences an absence of motion, a one-dimensional motion, or a two-dimensional motion (such as when the electronic device moves along the surface), one or more processors of the electronic device conclude that the a person intentionally is interacting with the touch-sensitive display. Accordingly, the one or more processors execute control operations in response to user input commands identified from the touch input.

By contrast, if the electronic device experiences movement or motion in three dimensions, i.e., in more than two dimensions in free space, the one or more processors conclude that a person is instead attempting to lift, lower, or otherwise grasp and/or pick up the electronic device. When this occurs, in one or more embodiments the one or more processors simply ignore the touch input by precluding the performance or execution of control operations corresponding to the user input commands identified from the touch input. Thereafter, in one or more embodiments the one or more processors return to a normal mode of operation with the touch-sensitive display responding to any and all touch input.

Thus, in one or more explanatory embodiments, one or more processors operating in conjunction with an accelerometer determine whether the electronic device is stationary on a supporting surface. In one or more embodiments, the one or more processors further determine whether the electronic device is in an unlocked mode of operation, as well as whether the touch-sensitive display is actively presenting content, information, user actuation targets, or combinations thereof. In one or more embodiments, the preclusion feature described above then becomes enabled.

In one or more embodiments, when the preclusion feature is enabled and touch input is received, this touch input is buffered. Action on the touch input is delayed in one or more embodiments. Motion of the electronic device can then be buffered by monitoring one or more motion sensors of the electronic device while the touch input is being received, with the one or more processors of the electronic device storing a data representation of the motion of the electronic device in a memory of the electronic device.

When the touch event ends, e.g., when the object delivering the touch input releases the touch-sensitive display, in one or more embodiments the one or more processors of the electronic device analyze and process the data representation of the motion of the electronic device to determine if it identifies movement of the electronic device in more than two dimensions in free space. Where it does, the one or more processors conclude that the touch input is intended to grasp, pick up, or otherwise move the electronic device. Otherwise, the one or more processors conclude that the touch input is intended to cause control operations to be executed.

It should be noted that the electronic device can move in two or fewer dimensions by sliding across a flat surface, even when that flat surface is tilted relative to the direction of gravity. Accordingly, embodiments of the disclosure work with surfaces that are horizontal or slanted.

In one or more embodiments, if the touch input is intended to cause control operations to be executed, the one or more processors then execute the control operation identified by the user input command associated with the touch input. By contrast, if the touch input is intended to pick up or move the electronic device, the touch input is ignored. Thereafter, the electronic device returns to a normal state where the touch-sensitive display acts in response to any touch input.

Figure 9:
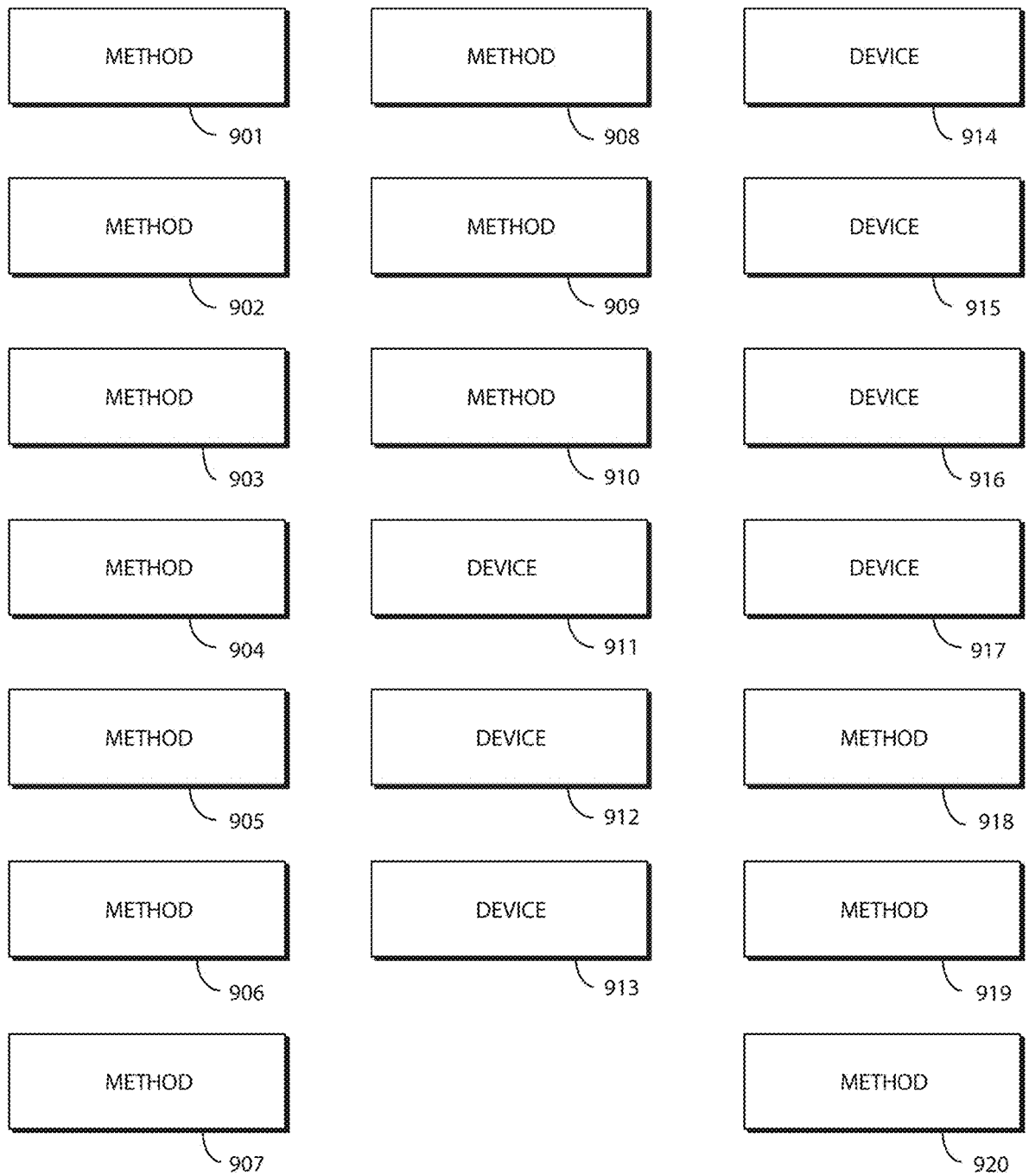
FIG. 9 illustrates various embodiments of the disclosure.

Turning now to FIG. 9, illustrated therein are various embodiments of the disclosure. At 901, a method in an electronic device comprises receiving, as touch input at a touch-sensitive display of the electronic device, a user input command to perform a control operation from an object touching the touch-sensitive display. At 901, the method comprises determining, with one or more motion sensors of the electronic device, whether the electronic device moves in three-dimensional space while the object is touching the touch-sensitive display. At 901, the method comprises, where (or when) the electronic device moved in the three-dimensional space while the object was touching the touch-sensitive display, precluding, with one or more processors of the electronic device, execution of the control operation in response to the user input command. As noted above, on the outside chance that a person could lift the electronic device in a perfectly vertical, one-dimensional motion, the electronic device of 901 can be modified to determine whether the electronic device moved in one dimension against the direction of gravity as well.

At 902 the receiving of 901 occurs when the electronic device is in an unlocked mode of operation. At 903, the method of 902 further comprises determining, with the one or more motion sensors, whether the electronic device is stationary when the touch input is initially received. At 903, the precluding occurs only when the electronic device was both in the unlocked mode of operation and stationary when the touch input was initially received.

At 904, the method of 901 further comprises monitoring, with the one or more motion sensors, motion of the electronic device while the object is touching the touch-sensitive display. At 904, the method of 901 further comprises storing, with the one or more processors, a data representation of the motion of the electronic device in a memory of the electronic device.

At 905, the method of 904 further comprises detecting, with the touch-sensitive display, the object releasing the touch-sensitive display. At 905, and where the electronic device failed to move in the three-dimensional space while the object was touching the touch-sensitive display, the method of 904 further comprises executing, with the one or more processors of the electronic device, the control operation in response to the user input command.

At 906, the determining whether the electronic device moves in three-dimensional space while the object is touching the touch-sensitive display at 905 comprises identifying, with the one or more processors, whether the data representation of the motion of the object stored in the memory of the electronic device indicates a three-dimensional motion of the electronic device beyond a predefined threshold.

At 907, the method of 901 further comprises, after precluding the execution of the control operation in response to the user input command, receiving, with the touch-sensitive display, another touch input defining another user input command to perform another control operation. At 907, the method of 901 further comprises executing, with the one or more processors, the another control operation in response to another the user input command.

At 908, the method of 901 further comprises identifying, with the touch-sensitive display, whether the touch input occurs at a location corresponding to a user actuation target of the one or more user actuation targets. At 908, the method of 901 further comprises, where the touch input occurs at the location corresponding to the user actuation target, initiating a timer.

At 909 the determining whether the electronic device moved in the three-dimensional space while the object was touching the touch-sensitive display of 908 occurs upon or after expiration of the timer. At 910, the method of 909 further comprises detecting, with the touch-sensitive display, the object releasing the touch-sensitive display. At 910, the precluding the execution of the control operation in response to the user input command of 909 occurs only after both the expiration of the timer and release of the touch-sensitive display by the object. At 911, the method of 909 further comprises detecting, with the touch-sensitive display, the object releasing the touch-sensitive display, and thereafter, where the electronic device failed to move in the three-dimensional space while the object was touching the touch-sensitive display, executing, with the one or more processors of the electronic device, the control operation in response to the user input command.

At 912, an electronic device comprises a touch-sensitive display. At 912, the electronic device comprises one or more processors operable with the touch-sensitive display. At 912, the electronic device comprises one or more motion sensors operable with the one or more processors.

At 912, the touch-sensitive display detects touch input at a surface of the touch-sensitive display. At 912, the touch input identifies a user input command requesting performance of a control operation.

At 912, the one or more motion sensors determine whether the electronic device moves in three-dimensional space while the touch input is occurring. At 912, the one or more processors preclude execution of the control operation in response to the touch input where the electronic device moved in the three-dimensional space while the touch input was occurring.

At 913, the touch-sensitive display of 912 identifies a cessation of the touch input. At 913, the one or more processors of 912 execute the control operation in response to the cessation of the touch input where the electronic device failed to move in the three-dimensional space while the touch input was occurring.

At 914, the touch-sensitive display of 912 detects, after the one or more processors preclude the execution of the control operation, another touch input identifying another user input command requesting performance of another control operation. At 914, the one or more processors of 912 execute the another control operation in response to the another touch input.

At 915, the one or more processors of 912 cause a presentation of at least one user actuation target on the touch-sensitive display prior to the touch input occurring. At 915, the touch-sensitive display of 912 identifies whether the touch input occurs at a location corresponding to the at least one user actuation target. At 915, the one or more processors of 912 initiate a timer where the touch input occurs at the location corresponding to the at least one user actuation target.

At 916, the touch-sensitive display of 915 identifies a cessation of the touch input prior to expiration of the timer. At 916, the one or more processors of 915 preclude the execution of the control operation in response to the touch input where the electronic device moved in the three-dimensional space while the touch input was occurring in response to the cessation of the touch input.

At 917, the touch-sensitive display of 915 identifies a cessation of the touch input after an expiration of the timer. At 917, the one or more processors of 915 preclude the execution of the control operation in response to the touch input where the electronic device moved in the three-dimensional space while the touch input was occurring in response to both the cessation of the touch input and the expiration of the timer.

At 918, a method in an electronic device comprises detecting, with one or more motion sensors of the electronic device, a lack of motion of the electronic device for at least a predefined amount of time while the electronic device is in an unlocked mode of operation. At 918, the method comprises receiving, with a touch-sensitive display of the electronic device, touch input identifying a user command to perform a control operation. At 918, the method comprises determining, with the one or more motion sensors, whether the electronic device moves in more than two dimensions in free space during the touch input. At 918, the method comprises, where the electronic device moves in the more than the two dimensions in the free space, precluding performance of the control operation in response to the user command.

At 919, the method of 918 further comprises initiating, with the one or more processors, a timer where the touch input occurs at a location of the touch-sensitive display corresponding to a user actuation target. At 920, the method of 919 further comprises performing the control operation in response to the user command where both the electronic device moved in two or fewer dimensions in free space during the touch input and expiration of the timer.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   receiving, as touch input at a touch-sensitive display of the electronic device, a user input command to perform a control operation from an object touching the touch-sensitive display;
   determining, with one or more motion sensors of the electronic device, whether the electronic device moves in three-dimensional space while the object is touching the touch-sensitive display; and
   where the electronic device moved in the three-dimensional space while the object was touching the touch-sensitive display, precluding, with one or more processors of the electronic device, execution of the control operation in response to the user input command;
   wherein the receiving occurs when the electronic device is in an unlocked mode of operation.

2. The method of claim 1, wherein the receiving occurs when the touch-sensitive display is presenting one or more user actuation targets.

3. The method of claim 1, further comprising determining, with the one or more motion sensors, whether the electronic device is stationary when the touch input is initially received, wherein the precluding occurs only when the electronic device was both in the unlocked mode of operation and stationary when the touch input was initially received.

4. The method of claim 1, further comprising:
   monitoring, with the one or more motion sensors, motion of the electronic device while the object is touching the touch-sensitive display; and
   storing, with the one or more processors, a data representation of the motion of the electronic device in a memory of the electronic device.

5. The method of claim 4, further comprising:
   detecting, with the touch-sensitive display, the object releasing the touch-sensitive display; and
   where the electronic device failed to move in the three-dimensional space while the object was touching the touch-sensitive display, executing, with the one or more processors of the electronic device, the control operation in response to the user input command.

6. The method of claim 5, wherein the determining whether the electronic device moves in three-dimensional space while the object is touching the touch-sensitive display comprises identifying, with the one or more processors, whether the data representation of the motion of the object stored in the memory of the electronic device, indicates a three-dimensional motion of the electronic device beyond a predefined threshold.

7. The method of claim 1, further comprising:
   after precluding the execution of the control operation in response to the user input command, receiving, with the touch-sensitive display, another touch input defining another user input command to perform another control operation; and
   executing, with the one or more processors, the another control operation in response to another the user input command.

8. The method of claim 1, further comprising:
   identifying, with the touch-sensitive display, whether the touch input occurs at a location corresponding to a user actuation target of one or more user actuation targets; and
   where the touch input occurs at the location corresponding to the user actuation target, initiating a timer.

9. The method of claim 8, wherein the determining whether the electronic device moved in the three-dimensional space while the object was touching the touch-sensitive display occurs upon or after expiration of the timer.

10. The method of claim 9, further comprising detecting, with the touch-sensitive display, the object releasing the touch-sensitive display, wherein the precluding the execution of the control operation in response to the user input command occurs only after both the expiration of the timer and release of the touch-sensitive display by the object.

11. The method of claim 9, further comprising detecting, with the touch-sensitive display, the object releasing the touch-sensitive display, and thereafter, where the electronic device failed to move in the three-dimensional space while the object was touching the touch-sensitive display, executing, with the one or more processors of the electronic device, the control operation in response to the user input command.

12. A method in an electronic device, the method comprising:
   receiving, as touch input at a touch-sensitive display of the electronic device, a user input command to perform a control operation from an object touching the touch-sensitive display;
   monitoring, with one or more motion sensors, motion of the electronic device while the object is touching the touch-sensitive display;

storing, with one or more processors, a data representation of the motion of the electronic device in a memory of the electronic device;

determining, with the one or more motion sensors of the electronic device, whether the electronic device moves in three-dimensional space while the object is touching the touch-sensitive display; and where the electronic device moved in the three-dimensional space while the object was touching the touch-sensitive display, precluding, with the one or more processors of the electronic device, execution of the control operation in response to the user input command; and further detecting, with the touch-sensitive display, the object releasing the touch-sensitive display; and where the electronic device failed to move in the three-dimensional space while the object was touching the touch-sensitive display, executing, with the one or more processors of the electronic device, the control operation in response to the user input command.

13. The method of claim 12, wherein the receiving occurs when the touch-sensitive display is presenting one or more user actuation targets.

14. The method of claim 12, further comprising determining, with the one or more motion sensors, whether the electronic device is stationary when the touch input is initially received, wherein the precluding occurs only when the electronic device was both in an unlocked mode of operation and stationary when the touch input was initially received.

15. The method of claim 12, wherein the determining whether the electronic device moves in three-dimensional space while the object is touching the touch-sensitive display comprises identifying, with the one or more processors, whether the data representation of the motion of the object stored in the memory of the electronic device, indicates a three-dimensional motion of the electronic device beyond a predefined threshold.

16. The method of claim 12, further comprising:

after precluding the execution of the control operation in response to the user input command, receiving, with the touch-sensitive display, another touch input defining another user input command to perform another control operation; and executing, with the one or more processors, the another control operation in response to another the user input command.

17. The method of claim 12, further comprising:

identifying, with the touch-sensitive display, whether the touch input occurs at a location corresponding to a user actuation target of one or more user actuation targets; and where the touch input occurs at the location corresponding to the user actuation target, initiating a timer.

18. The method of claim 17, wherein the determining whether the electronic device moved in the three-dimensional space while the object was touching the touch-sensitive display occurs upon or after expiration of the timer.

19. The method of claim 17, further comprising detecting, with the touch-sensitive display, the object releasing the touch-sensitive display, wherein the precluding the execution of the control operation in response to the user input command occurs only after both the expiration of the timer and release of the touch-sensitive display by the object.

20. The method of claim 19, further comprising detecting, with the touch-sensitive display, the object releasing the touch-sensitive display, and thereafter, where the electronic device failed to move in the three-dimensional space while the object was touching the touch-sensitive display, executing, with the one or more processors of the electronic device, the control operation in response to the user input command.

* * * * *